United States Patent
Tudor et al.

(10) Patent No.: US 11,856,252 B2
(45) Date of Patent: *Dec. 26, 2023

(54) VIDEO BROADCASTING THROUGH AT LEAST ONE VIDEO HOST

(71) Applicants: Charles R. Tudor, Virginia Beach, VA (US); Dani R. Sleiman, Virginia Beach, VA (US)

(72) Inventors: Charles R. Tudor, Virginia Beach, VA (US); Dani R. Sleiman, Virginia Beach, VA (US)

(73) Assignee: Worldwide Live Holding, LLC, Chesapeake, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/095,360

(22) Filed: Jan. 10, 2023

(65) Prior Publication Data

US 2023/0164379 A1 May 25, 2023

Related U.S. Application Data

(63) Continuation of application No. 17/345,762, filed on Jun. 11, 2021, now Pat. No. 11,553,229, which is a continuation-in-part of application No. 15/730,106, filed on Oct. 11, 2017, now Pat. No. 11,681,748, and a continuation-in-part of application No. 15/516,680, (Continued)

(51) Int. Cl.
*H04N 21/2743* (2011.01)
*H04N 21/2187* (2011.01)
*H04N 21/482* (2011.01)
*H04N 21/414* (2011.01)
*H04N 21/422* (2011.01)

(52) U.S. Cl.
CPC ..... *H04N 21/2743* (2013.01); *H04N 21/2187* (2013.01); *H04N 21/41407* (2013.01); *H04N 21/42203* (2013.01); *H04N 21/482* (2013.01)

(58) Field of Classification Search
CPC ......... H04N 21/2743; H04N 21/41407; H04N 21/4223; H04L 65/4076
See application file for complete search history.

(56) References Cited

U.S. PATENT DOCUMENTS 7,779,444 B2 * 8/2010 Glad ................. H04N 21/4882 725/23
2009/0252481 A1 * 10/2009 Ekstrand ................ H04N 5/772 386/239

(Continued)

*Primary Examiner* — Jason Salce
(74) *Attorney, Agent, or Firm* — Shaddock Law Group, PC

(57) ABSTRACT

A method for providing captured video to a subsequent user device, via a video host, including at least some of allowing a user to designate, via a mobile device, at least one video host; allowing the subsequent user, via the subsequent user device, to be associated with the at least one video host; allowing the user to capture video, via the mobile device, and upload or stream the captured video to the video host device(s), wherein the captured video includes at least one categorization for the captured video, as designated by the user prior to capturing the video; and allowing the subsequent user to access, via the subsequent user device, the captured video, via the video host device associated with the at least one video host, wherein the captured video is accessed, based on the at least one categorization for the captured video.

20 Claims, 16 Drawing Sheets

Related U.S. Application Data filed as application No. PCT/US2017/025803 on Apr. 3, 2017, now abandoned.

(60) Provisional application No. 62/403,629, filed on Oct. 3, 2016, provisional application No. 62/319,044, filed on Apr. 6, 2016.

(56) References Cited

U.S. PATENT DOCUMENTS

| | | | |
|---|---|---|---|
| 2013/0005294 A1* | 1/2013 | Levinson | G08B 25/005 455/404.1 |
| 2013/0222418 A1* | 8/2013 | Campbell | G06F 3/1454 345/629 |
| 2015/0312289 A1* | 10/2015 | Shen | H04W 4/21 709/204 |
| 2017/0214945 A1* | 7/2017 | Chang | H04W 4/80 |

* cited by examiner

VIDEO BROADCASTING THROUGH AT LEAST ONE VIDEO HOST

CROSS-REFERENCE TO RELATED APPLICATIONS

This patent application is a continuation of U.S. patent application Ser. No. 17/345,762, filed Jun. 11, 2021, which is a continuation-in-part of U.S. patent application Ser. No. 15/730,106, filed Oct. 11, 2017, and is also a continuation-in-part of U.S. patent application Ser. No. 15/516,680, filed Apr. 4, 2017, which is a U.S. National Stage Entry under 35 U.S.C. § 371 of International Application No. PCT/US17/25803, filed Apr. 4, 2017, which claims the benefit of U.S. Patent Application Ser. No. 62/319,044, filed Apr. 6, 2016 and U.S. Patent Application Ser. No. 62/503,629, filed Oct. 3, 2016, the disclosures of which are incorporated herein in their entireties by reference.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

NOTICE OF COPYRIGHTED MATERIAL

The disclosure of this patent document contains material that is subject to copyright protection. The copyright owner has no objection to the reproduction by anyone of the patent document or the patent disclosure, as it appears in the Patent and Trademark Office patent file or records, but otherwise reserves all copyright rights whatsoever. Unless otherwise noted, all trademarks and service marks identified herein are owned by the applicant.

BACKGROUND OF THE PRESENT DISCLOSURE

1. Field of the Present Disclosure

The present disclosure relates generally to a smartphone or other mobile device mobile application. More specifically, the present disclosure relates to systems and methods for providing a direct broadcast connection between a user capturing live events via a smartphone or other mobile device and end-user in real time sent over a computer network such as, for example, the World Wide Web.

2. Description of Related Art

Capturing and uploading video content to the web and other social media accounts has become a huge part of the social media user experience—providing the ability to relive and view user uploaded events captured by their mobile devices. Millions of videos captured by users are uploaded daily to social media sites such as Facebook and YouTube among others. These videos are not viewed in real time, but subsequently viewed and ranked as to popularity with some going viral. Some social media platforms allow users to livestream events out to friends they have chosen and in general to anyone on the web who may find them. Everything is coming from the user in a one-way direction with no real-time capability for someone who wants to use that video in real-time to be able to contact the streamer (i.e., the individual cameraperson shooting the live event with their mobile device) and control the use of the camera.

Currently, end-users (News and non-news organizations) have limited ability to receive live-streamed video as events take place in real time. Presently, the end-user's only means of connection is provided by a non-direct to the end-user connection manner via social media applications. The original video transmissions are simply sent in an uncontrollable, non-broadcast format of live streams out into the World Wide Web to be potentially searched by an end-user, who, as a result, loses the element of live usage by the time they locate and connect to the live streams available.

Internal or interruptible feedback (IFB) is commonly used by television studios to facilitate private audio communications with a cameraperson. The private audio communication is not part of the video and audio being broadcasted and is only heard by the cameraperson. Typically, the cameraperson uses headphones or a headset to hear and communicate with the television studio.

IFB is an important feature because it allows for more accurate framing, it provides necessary instruction from the studio to the cameraperson, including when to start filming, zoom in, zoom out, focus on particular objects, and other general direction. The cam eraperson on location is often the "voice", "eyes", and "ears" of the studio. Without IFB, one cannot usually have accurate or practical videography. Most news stations will not accept live video/audio feeds unless there is live IFB communication with the cameraperson in the field.

It is also known in the art that mobile devices can transmit and receive audio/video communications via the cameras and microphones available on the mobile devices, such as cellular smartphones. In all instances known in the art, such audio and video are tied together in a single stream. For example, with services such as Skype and Apple FaceTime, audio and video is transmitted with two-way real-time communications from one mobile device (or computer) to another mobile device (or computer), and vice versa. In another example, such as YouTube Live and Facebook Live, audio and video is transmitted one-way from a mobile device (or computer) to a website where the same is viewable by others.

Any discussion of documents, acts, materials, devices, articles, or the like, which has been included in the present specification is not to be taken as an admission that any or all of these matters form part of the prior art base or were common general knowledge in the field relevant to the present disclosure as it existed before the priority date of each claim of this application.

BRIEF SUMMARY OF THE PRESENT DISCLOSURE

However, based on the popularity of streaming video, there exists an overwhelming volume of such streams that are available for viewing. In the era of "big data", everyone is looking for ways to sort through and cull down the massive amounts of data to just what is desired, relevant, or useful. Current approaches of streaming user uploaded video content in real-time via the web and social media platforms have been unsuccessful in an organized, relevant manner acceptable to use by professional broadcast professionals.

The current practices and capabilities of live stream direct connections are ineffective, laborious, and limit the end-users real-time experience of a live event captured by a first-hand mobile device that they can have direct control over in that use. Without the capability of controlling the camera manipulation during live transmission, professional broadcasters will not take an unsolicited camera livestream live to broadcast. Doing so could result in inappropriate video being broadcast and dire consequences for the person or organization broadcasting the video.

Furthermore, there is no known system or method that allows a mobile device to capture and transmit live audio and video while simultaneously receiving a separate audio channel that is privately available only to the mobile device user and which does not interrupt or become part of the aforementioned live audio and video transmission.

In order to overcome these and various other shortcomings in the current state-of-the-art, in various exemplary, nonlimiting embodiments, the present disclosure provides a method for obtaining sorted, vetted, and geographically relevant video streams from mobile devices for use by various video hosts.

In accordance with various exemplary, nonlimiting embodiments of the disclosure, a direct broadcast connection over a network between a front-end smartphone or other mobile device with video content capturing and streaming capabilities and a back-end web interface is provided. The back-end web interface communicates and corresponds with the one or more front end-user mobile device applications in order to provide live video streaming for broadcast purposes or storage in an archived cloud database stored on a computer readable medium for later retrieval.

In certain exemplary, nonlimiting embodiments, the present disclosure incorporates a Direct Broadcast Connection (DBC) between one or more mobile devices with video streaming and/or recording capabilities, having an App installed, one or more video hosts and one or more subsequent viewer devices.

Moreover, the systems and/or methods of the present disclosure demystify live news or emergency event streaming for average videographers (using mobile devices) and directly connects (or connects through the distributed network) the mobile devices with subsequent viewer devices. The provision of a direct to use or broadcast connection and subsequent control and communication between the videographer (utilizing the mobile device) and the CamCaster Control Room interface for a video host, delivers live video streams in broadcastable form, which video hosts can use with a high degree of confidence and control. The systems and methods of the present disclosure provide an improvement over known social media and other Apps that simply send uncontrollable video or video streams to the Internet to be searched for by subsequent viewers who subsequently loose the element of live usage by the time they locate live video streams.

Many mobile devices have multiple input and output options. For example, a Smartphone typically has a camera on the front and back of the device, a microphone at the front and at the bottom, a speaker at the top and at the bottom, a "headphone" jack where the device can transmit audio to a wired headset and receive audio from the wired headset's microphone, and wireless Bluetooth which allows a wireless device to send and receive audio to and from the Smartphone.

Mobile devices, such as cellular Smartphones, have the ability to transmit and receive different "streams" of audio using VoIP from the different input and outputs on such devices. Through the invention software, the invention is able to route the audio and video from one set of inputs on the mobile device to the recipient, by receiving a separate and independent audio feed that may be directed though different audio inputs and outputs, thereby effectively creating two independent streams.

Through the systems and methods of the present disclosure, when a MyLiveApp user starts a live video and audio stream, the software provides access to the audio and video inputs of the mobile device for purposes of transmitting the live video and audio feed. However, simultaneously while streaming said video and audio, the invention software creates a multi-channel audio access that allows the mobile device output (speaker), and optionally a separate mobile device input (microphone), to connect over the second initiated VoIP network back to the CamCaster Control Room. With this multi-channel audio access, the one-way or two-way separate audio communication does not interrupt the simultaneous live video audio transmission.

All of the communications discussed herein take place using VoIP over the mobile device's data connection, such as the cellular LTE connection or a WiFi connection of a smartphone, and they do not take place over the standard voice-only communication channel available on cellular phones.

In various exemplary, nonlimiting embodiments of the present disclosure, the systems and/or methods of the present disclosure function by providing a user, via the mobile device, with a listing of one or more available media host(s) or outlet(s); allowing the user, via the mobile device, to select one or more desired media host(s) or outlet(s) from the one or more available media host(s) or outlet(s); associating the mobile device with the selected one or more desired media host(s) or outlet(s), such that the selected one or more desired media host(s) or outlet(s) will be recipient(s) of live stream video from the mobile device; allowing the user to live stream video, via the mobile device, and provide the live stream video to the selected one or more desired media host(s) or outlet(s), wherein a host of the selected one or more desired media host(s) or outlet(s) is enabled to engage in live two-way audio communications with the user, via the mobile device, as the live stream video is being captured, and wherein the live two-way audio communications between the user and the host are communicated, via the mobile device, separate from, simultaneous with, and in addition to any audio associated with the live stream video; and communicating any of the live two-way audio communications, via the mobile device, wherein the audio associated with the live stream video is captured, via the mobile device, via a microphone that is separate from a microphone used to capture the live two-way audio communications, and wherein the microphone used to capture the audio associated with the live stream video and the microphone used to capture the live two-way audio communications are each at a geographic location of the mobile device at the time the live stream video and any of the live two-way audio communications are being captured.

In various exemplary, nonlimiting embodiments each of the news outlets is a news and/or media outlet.

In various exemplary, nonlimiting embodiments the live two-way audio communications between the user and the host allow the host to direct the user as to framing of the live stream video.

In various exemplary, nonlimiting embodiments the user may optionally establish one or more media host(s) or outlet(s), to be associated with a particular event description or tag.

In various exemplary, nonlimiting embodiments selection of the one or more desired media host(s) or outlet(s) by the user initiates an approval request to each of the selected one or more desired media host(s) or outlet(s).

In various exemplary, nonlimiting embodiments the systems and/or methods of the present disclosure optionally function by allowing the user to live stream video and provide the live stream video to the selected one or more desired media host(s) or outlet(s) includes allowing the user to capture live stream video and provide the live stream video exclusively to the selected one or more desired media host(s) or outlet(s).

In various exemplary, nonlimiting embodiments the systems and/or methods of the present disclosure optionally function by allowing the selected one or more desired media host(s) or outlet(s) to provide the live stream video to one or more subsequent users.

In various exemplary, nonlimiting embodiments the systems and/or methods of the present disclosure optionally function by requiring the user to designate at least one categorization for the live stream video, prior to capturing the live stream video.

In various exemplary, nonlimiting embodiments the systems and/or methods of the present disclosure optionally function by allowing the selected one or more desired media host(s) or outlet(s) to provide the live stream video to one or more subsequent viewers, based on the at least one categorization for the live stream video.

In various exemplary, nonlimiting embodiments the systems and/or methods of the present disclosure optionally function by allowing the selected one or more desired media host(s) or outlet(s) to store the live stream video.

In various exemplary, nonlimiting embodiments the live two-way audio communications with the user enable the host to query and/or direct the user.

In various exemplary, nonlimiting embodiments the selected one or more desired media host(s) or outlet(s) is enabled to engage in text or nonverbal communications with the user, as the live stream video is being captured.

In various exemplary, nonlimiting embodiments the systems and/or methods of the present disclosure optionally function by requiring the user to designate at least one categorization for the live stream video, prior to capturing the live stream video.

In various exemplary, nonlimiting embodiments the systems and/or methods of the present disclosure optionally function by Identifying the geographic location where the live stream video is captured and wherein the live stream video is accessed, based on the at least one categorization for the live stream video.

In various exemplary, nonlimiting embodiments of the present disclosure, the systems and/or methods of the present disclosure function by allowing a user to designate, via a mobile device, at least one desired media host or outlet; allowing a subsequent user, via the subsequent user device, to be associated with the at least one desired media host or outlet; allowing the user to live stream video, via the mobile device, and provide the live stream video to the at least one desired media host or outlet, wherein a host of the designated at least one desired media host or outlet is enabled to engage in live two-way audio communications with the user, via the mobile device, as the live stream video is being captured, wherein the live two-way audio communications between the user and the host are communicated, via the mobile device, separate from, simultaneous with, and in addition to any audio associated with the live stream video, and wherein the live stream video includes at least one categorization for the live stream video, as designated by the user prior to capturing the live stream video; communicating any of the live two-way audio communications, via the mobile device, wherein the audio associated with the live stream video is captured, via the mobile device, via a microphone that is separate from a microphone used to capture the live two-way audio communications, and wherein the microphone used to capture the audio associated with the live stream video and the microphone used to capture the live two-way audio communications are each at a geographic location of the mobile device at the time the live stream video and any of the live two-way audio communications are being captured; and allowing the subsequent user to access, via the subsequent user device, the captured live stream video, via the at least one desired media host or outlet, wherein the captured live stream video is accessed, based on the at least one categorization for the captured live stream video.

In various exemplary, nonlimiting embodiments each of the at least one desired news outlet is a news and/or media outlet.

In various exemplary, nonlimiting embodiments the selected one or more desired media host(s) or outlet(s) is enabled to engage in text or nonverbal communications with the user, as the live stream video is being captured.

In various exemplary, nonlimiting embodiments the systems and/or methods of the present disclosure optionally function by allowing the selected one or more desired media host(s) or outlet(s) to store the captured live stream video.

In various exemplary, nonlimiting embodiments the systems and/or methods of the present disclosure optionally function by identifying the geographic location where the live stream video is captured and wherein the captured live stream video is accessed, based on the at least one categorization for the captured live stream video.

In various exemplary, nonlimiting embodiments of the present disclosure, the systems and/or methods of the present disclosure function by allowing a user to capture live stream video, via a mobile device, and provide the captured live stream video to at least one desired media host or outlet, wherein a host of the selected at least one desired media host or outlet is enabled to engage in live two-way audio communications with the user, via the mobile device, as the live stream video is being captured, and wherein the live two-way audio communications between the user and the host are communicated, via the mobile device, separate from, simultaneous with, and in addition to any audio associated with the live stream video; and communicating any of the live two-way audio communications, via the mobile device, wherein the audio associated with the live stream video is captured, via the mobile device, via a microphone that is separate from a microphone used to capture the live two-way audio communications, and wherein the microphone used to capture the audio associated with the live stream video and the microphone used to capture the live two-way audio communications are each at a geographic location of the mobile device at the time the live stream video and any of the live two-way audio communications are being captured.

In various exemplary, nonlimiting embodiments of the present disclosure, the systems and/or methods of the present disclosure provide a method for direct video broadcasting to at least one video host, via a mobile device, comprising: allowing the at least one video host to initiate an audio communication with a user, via the user's mobile device; allowing the user, via the mobile device, to accept the initiated audio communication from the at least one video host; providing, in response to the user accepting the initiated audio communication, audio communication between the user and the at least one video host; and allowing, in response to the user accepting the initiated audio communication, the user to capture video, via the mobile device, and upload or stream the captured video to the at least one video host, wherein the at least one video host is enabled to engage in audio communications with the user, as the captured video is being captured, and wherein the audio communication is separate from the audio associated with any video being captured.

In various exemplary, nonlimiting embodiments the initiated audio communication is a nonverbal communication.

In various exemplary, nonlimiting embodiments the audio communication is a Voice-Over-IP ("VoIP") audio communication.

In various exemplary, nonlimiting embodiments the audio communication is a one way communication from the at least one video host to the user or a two way communication between the at least one video host and the user.

In various exemplary, nonlimiting embodiments the audio communication is accomplished via an external speaker and/or microphone attached or coupled via wired connection or wirelessly to the mobile device or a speaker and/or microphone of the mobile device, which is separate from a speaker and/or microphone of the mobile device utilized for capturing audio associated with video being captured by the mobile device.

In various exemplary, nonlimiting embodiments of the present disclosure, the systems and/or methods of the present disclosure allow the at least one video host to provide the captured video to one or more subsequent users.

In various exemplary, nonlimiting embodiments of the present disclosure, the systems and/or methods of the present disclosure require the user to designate at least one categorization for the captured video, prior to capturing the video.

In various exemplary, nonlimiting embodiments of the present disclosure, the systems and/or methods of the present disclosure allow the at least one video host to store the captured video.

In various exemplary, nonlimiting embodiments the at least one video host is enabled to engage in text or nonverbal communications with the user, as the captured video is being captured.

In various exemplary, nonlimiting embodiments of the present disclosure, the systems and/or methods of the present disclosure provide a method for direct video broadcasting to at least one video host, via a mobile device, comprising: allowing a user to initiate an audio communication with at least one video host, via the user's mobile device; allowing the at least one video host to accept the initiated audio communication from the user; providing, in response to the at least one video host accepting the initiated audio communication, audio communication between the at least one video host and the user; and allowing, in response to the at least one video host accepting the initiated audio communication, the user to capture video, via the mobile device, and upload or stream the captured video to the at least one video host, wherein the at least one video host is enabled to engage in audio communications with the user, as the captured video is being captured, and wherein the audio communication is separate from the audio associated with any video being captured.

Accordingly, the presently disclosed systems and/or methods separately and optionally provide methods for direct to video broadcasting to selected video hosts.

The presently disclosed systems and/or methods separately and optionally provide a direct to broadcast connection capability for real-time capture, streaming, and delivery of organized, relevant real-time video to end-users in an organized manner.

The presently disclosed systems and/or methods separately and optionally provide for the live streaming of video from mobile devices.

The presently disclosed systems and/or methods separately and optionally provide for video to be pre-categorized and/or geo-tagged for upload to determined video hosts.

The presently disclosed systems and/or methods separately and optionally provide for video to be sortable by category and/or geographic location for viewing by an end-viewer or subsequent viewer.

The presently disclosed systems and/or methods separately and optionally provide systems and methods that allow for the creation of online video channels by outlet host devices.

The presently disclosed systems and/or methods separately and optionally provide systems and methods for outlet host devices to create a video outlet, allow videographers to provide video content, and allow subsequent viewers to access the created video outlet to view the video content.

The presently disclosed systems and/or methods separately and optionally make it possible for outlet host devices to create a video presence and compete with other, well-established video, news, or media hosts or outlets.

The presently disclosed systems and/or methods separately and optionally provide systems and methods that are customizable for both consumer and corporate users.

The presently disclosed systems and/or methods separately and optionally provide a direct broadcast connection over a network between a mobile device with video content capturing and streaming capabilities and a back-end web interface.

The presently disclosed systems and/or methods separately and optionally provide a method for providing a real-time feedback loop between video host and subsequent viewers.

These and other aspects, features, and advantages of the presently disclosed systems and/or methods are described in or are apparent from the following detailed description of the exemplary, non-limiting embodiments of the presently disclosed systems and/or methods and the accompanying figures. Other aspects and features of embodiments of the presently disclosed systems and/or methods will become apparent to those of ordinary skill in the art upon reviewing the following description of specific, exemplary embodiments of the presently disclosed systems and/or methods in concert with the figures. While features of the presently disclosed systems and/or methods may be discussed relative to certain embodiments and figures, all embodiments of the presently disclosed systems and/or methods can include one or more of the features discussed herein. Further, while one or more embodiments may be discussed as having certain advantageous features, one or more of such features may also be used with the various embodiments of the systems and/or methods discussed herein. In similar fashion, while exemplary embodiments may be discussed below as device, system, or method embodiments, it is to be understood that such exemplary embodiments can be implemented in various devices, systems, and methods of the presently disclosed systems and/or methods.

Any benefits, advantages, or solutions to problems that are described herein with regard to specific embodiments are not intended to be construed as a critical, required, or essential feature(s) or element(s) of the presently disclosed systems and/or methods or the claims.

BRIEF DESCRIPTION OF THE SEVERAL VIEWS OF THE DRAWINGS

As required, detailed exemplary embodiments of the presently disclosed systems and/or methods are disclosed herein; however, it is to be understood that the disclosed embodiments are merely exemplary of the presently disclosed systems and/or methods that may be embodied in various and alternative forms, within the scope of the presently disclosed systems and/or methods. The figures are not necessarily to scale; some features may be exaggerated or minimized to illustrate details of particular components. Therefore, specific structural and functional details disclosed herein are not to be interpreted as limiting, but merely as a basis for the claims and as a representative basis for teaching one skilled in the art to employ the presently disclosed systems and/or methods.

The exemplary embodiments of the presently disclosed systems and/or methods will be described in detail, with reference to the following figures, wherein like reference numerals refer to like parts throughout the several views, and wherein.

DETAILED DESCRIPTION OF EXEMPLARY EMBODIMENTS OF THE PRESENT DISCLOSURE

Figure 1:
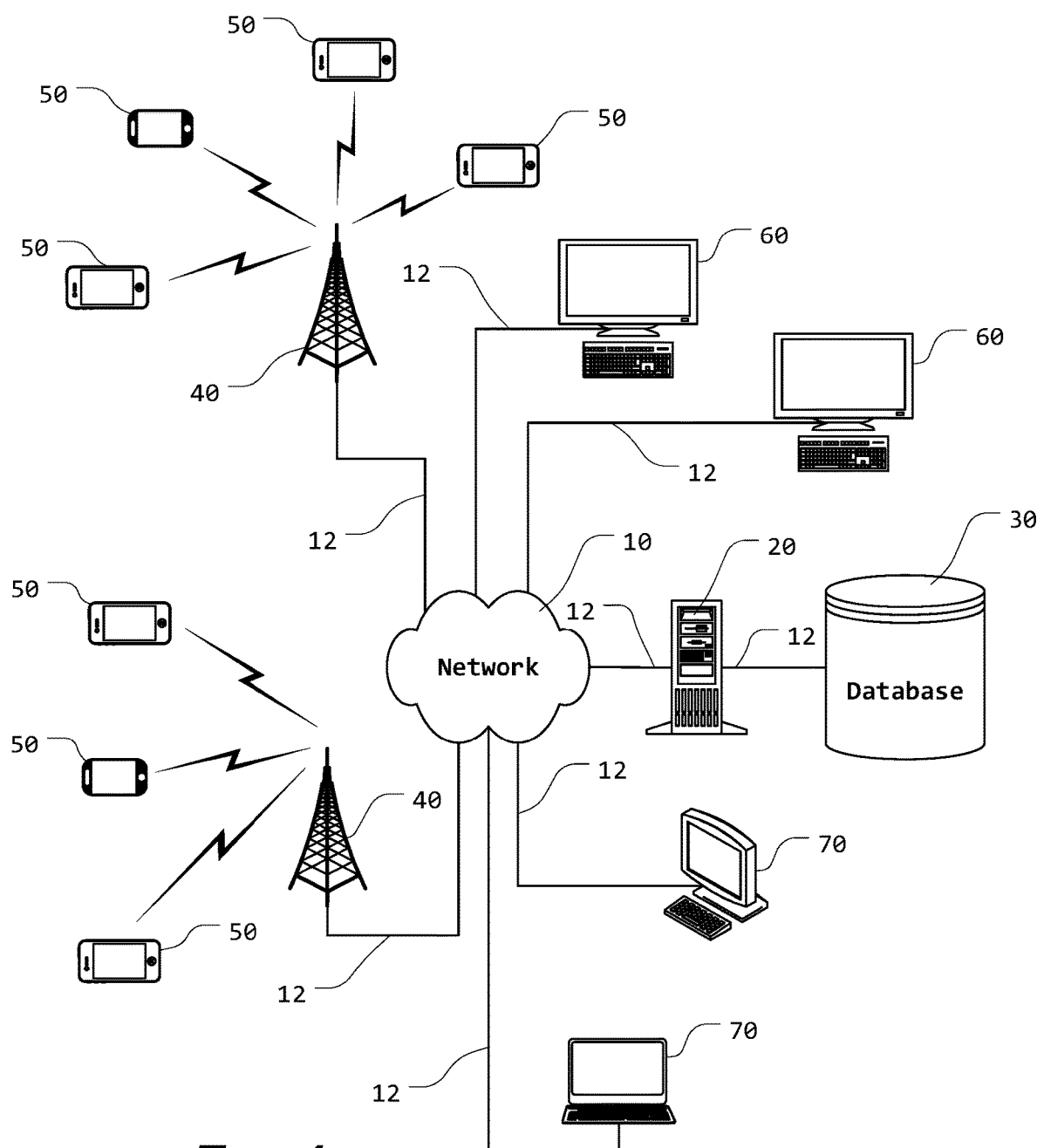
FIG. 1 illustrates a functional block diagram outlining an exemplary embodiment of the exemplary systems, methods, and/or apparatuses for direct video broadcasting to determined video hosts, according to the present disclosure.

For simplicity and clarification, the design factors and operating principles for direct video broadcasting through selected video hosts according to the presently disclosed systems and/or methods are explained with reference to various exemplary embodiments for direct video broadcasting through selected video hosts according to the presently disclosed systems and/or methods. The basic explanation of the design factors and operating principles for direct video broadcasting through selected video hosts is applicable for the understanding, design, and operation for direct video broadcasting through selected video hosts of the presently disclosed systems and/or methods. It should be appreciated that video or image capture can be adapted to any applications where video or image capture can be used or in conjunction with any live or recorded video broadcast.

As used herein, the word "may" is meant to convey a permissive sense (i.e., meaning "having the potential to"), rather than a mandatory sense (i.e., meaning "must"). Unless stated otherwise, terms such as "first" and "second" are used to arbitrarily distinguish between the exemplary embodiments and/or elements such terms describe. Thus, these terms are not necessarily intended to indicate temporal or other prioritization of such exemplary embodiments and/or elements.

The terms "a" and "an" are defined as one or more unless stated otherwise. Throughout this application, the terms "comprise" (and any form of comprise, such as "comprises" and "comprising"), "have" (and any form of have, such as "has" and "having"), "include", (and any form of include, such as "includes" and "including") and "contain" (and any form of contain, such as "contains" and "containing") are used as open-ended linking verbs. It will be understood that these terms are meant to imply the inclusion of a stated element, integer, step, or group of elements, integers, or steps, but not the exclusion of any other element, integer, step, or group of elements, integers, or steps. As a result, a system, method, or apparatus that "comprises", "has", "includes", or "contains" one or more elements possesses those one or more elements but is not limited to possessing only those one or more elements. Similarly, a method or process that "comprises", "has", "includes" or "contains"

one or more operations possesses those one or more operations but is not limited to possessing only those one or more operations.

It should also be appreciated that the terms "videographer", "mobile device", "outlet host device", "subsequent viewer device", and "video" are used for basic explanation and understanding of the operation of the systems, methods, and apparatuses of the presently disclosed systems and/or methods. Therefore, the terms "videographer", "mobile device", "outlet host device", "subsequent viewer device", and "video" are not to be construed as limiting the systems, methods, and apparatuses of the presently disclosed systems and/or methods. Thus, for example, the term "videographer" is to be understood to help to find the user, utilizing the mobile device to capture video and the App or other software to control the mobile device to operate in accordance with the systems and/or methods of the present disclosure.

The term "mobile device" is to be understood to broadly include any portable personal computer or similar device with a mobile operating system, such as, for example, mobile phone, smartphone, cellular phone, mobile phone, smartphone, tablet, portable media player, multi-purpose pocket computer, iPad, Google Tablet, Android platform, point of view camera, still or video camera, and the like.

The term "outlet host device" is to be understood to broadly include any computer or device utilized by a host (a "video host") to provide video for viewing by one or more subsequent viewer devices. This could include broadcast news, print news, news websites, social media websites, networking websites, or individually hosted or controlled websites. In various exemplary embodiments, the software associated with the MyLiveApp provides each outlet host device with a webpage or portal through which the video host can view video content being uploaded, streamed, and/or recorded, as well as certain information regarding the user providing the uploaded are streaming video. As utilized herein, the webpage or portal provided to each outlet host device may generally be referred to as the "CamCaster Control Room".

The term "subsequent viewer device" is to be understood to broadly include any computer or device utilized by an end-user or subscriber (a "subsequent viewer") to view video provided by one or more video hosts.

The term video is to be understood to broadly include live-streaming video, previously streamed video, uploaded video, previously uploaded video, converted video, and/or manipulated video. The term video is also understood to broadly include any video in any format, including, for example, Flash Video (FLV), MPEG-4 Part 14 (MP4), MPEG-1, MPEG-2, M4V, F4V, Vob, Ogg Video, Dirac, GIF, Video alternative to GIF, Multiple-image Network Graphics, AVI, QuickTime® File Format, Windows® Media Video, Raw video format, RealMedia® (RM), RealMedia® Variable Bitrate (RMVB), WebM, Matroska, Advanced Systems Format (ASF), AMV video format, SVI, 3GPP, 3GPP2, Material Exchange Format (MXF), ROQ, Nullsoft® Streaming Video (NSV), Flash Video (FLV) and/or Wowza. The term video is also to be understood to include video having any display resolution (i.e., the number of pixels in each dimension, for example 1920×1080) and having any pixel density (i.e., the number of pixels per unit distance or area). Furthermore, the term video is also understood to include any associated audio.

For simplicity and clarification, features of the presently disclosed systems and/or methods will be described as being used in conjunction with a mobile device, such as, for example, a mobile phone. However, it should be appreciated that these are merely exemplary embodiments of the disclosed features and are not to be construed as limiting the presently disclosed systems and/or methods. Thus, video may be captured, utilizing the presently disclosed systems and/or methods, by any mobile electronic or other device capable of capturing and sharing, streaming, or uploading currently captured or previously captured videos.

Turning now to the appended and included drawing figures, wherein the showings are for purposes of illustrating an exemplary version of the disclosure only and not for purposes of limiting the same, the present disclosure is a broadcast connection over a network between a mobile device with video content capturing and live video streaming capabilities and a back-end web interface communicating and corresponding with the one or more outlet host devices and/or subsequent viewer devices, computer applications in order to provide live video streaming for broadcast purposes or record said video in an archived cloud database stored on a server.

The following detailed description is of the best currently contemplated modes of carrying out exemplary versions of the disclosure. The description is not to be taken in the limiting sense, but is made merely for the purpose illustrating the general principles of the disclosure, since the scope of the disclosure is best defined by the appended claims.

Various inventive features are described below that can each be used independently of one another or in combination with other features.

With reference to the drawing Figs., FIG. 1 shows a functional block diagram outlining certain components of an exemplary embodiment of the systems and/or methods for direct video broadcasting to determined video hosts, according to the present disclosure. In certain illustrative, non-limiting embodiment(s) of this disclosure, the systems and/or methods utilize several components. For example, in various exemplary, nonlimiting embodiments, the present disclosure utilizes at least some of a distributed network 10, a server 20, a memory or database 30, one or more mobile communications base stations 40, one or more mobile devices 50, at least one outlet host device 60, and at least one subsequent viewer device 70.

In various exemplary embodiments, the systems and/or methods of the present disclosure are able to interact with a plurality of mobile devices 50, a plurality of video hosts 60, and a plurality of subsequent viewer devices 70. In various exemplary, nonlimiting embodiments, each mobile device 50, video host 60, and subsequent viewer device 70 is linked, either directly or indirectly, via wired or wireless linked connection(s) 12, to the distributed network 10, and, in turn, to the server 20 and the database 30.

In various exemplary, nonlimiting embodiments, at least some of the mobile devices 50, video hosts 60, and subsequent viewer devices 70 is linked, either directly or indirectly, via linked connection(s) 12, to one another, the server 20, and/or the database 30, without being connected through the distributed network 10.

The linked connection(s) 12 may be any known or later developed device or system for connecting at least some of the distributed network 10, the server 20, the database 30, the one or more mobile communications base stations 40, the mobile device(s) 50, the video host(s) 60, and/or the subsequent viewer device(s) 70, including a direct wired connection, a connection over a LAN, a WAN, or any other distributed network, a connection over the public switched telephone network, a connection over a Bluetooth connection, a WiFi connection, a connection over a cellular telephone network, a satellite connection or the like. In general, the linked connection(s) 12 may be any known or later developed connection system or structure usable to connect any of the distributed network 10, the server 20, the database 30, the one or more mobile communications base stations 40, the mobile device(s) 50, the video host(s) 60, and/or the subsequent viewer device(s) 70, including both wired and wireless connections.

In various exemplary, nonlimiting embodiments, the distributed network 10 is, for example, an intranet, an extranet, the Internet and, more particularly, the World Wide Web portion of the Internet, a Local Area Network (LAN), a Wide Area Network (WAN), or any other presently known or later developed distributed network 10. It should be appreciated that, in various exemplary embodiments, the distributed network 10 may be, for example, a particular node, such as, for example, a specific web page, of a larger distributed network 10.

In various exemplary, nonlimiting embodiments, the server 20 includes a processor, capable of receiving, processing, and/or transmitting video. The memory or database 30 is capable of receiving video for storage, storing video, and providing video for retrieval. The outlet host device 60 is capable of receiving video, converting, and/or manipulating video, and providing and/or uploading received, converted, and/or manipulated video for streaming or retrieval. The subsequent viewer device 70 is capable of receiving and/or retrieving and displaying the received the retrieved video on a screen to display. Any other known or later developed system capable of processing and outputting data could be used in place of the server 20.

It should be appreciated that the server 20 may optionally utilize sufficient security methods to ensure safe receipt, storage, and/or transmission and integrity of the video and/or data.

In various exemplary, nonlimiting embodiments, the memory or database 30 includes various suitable software programs and memory for storing video and/or other data. In various exemplary embodiments, the video contained within the database 30 may optionally comprise both streaming video (such as, for example, a stored copy of currently streaming video) and previously streamed video (such as, for example, a stored copy of previously streamed, converted, and/or manipulated video).

In various exemplary, nonlimiting embodiments, at least some of the data stored in the database 30 may optionally include data regarding various videographers, outlet host devices, mapping data, geolocation data, and other data necessary or desirable for enabling the systems and/or methods of the present disclosure.

It should be appreciated that the streaming video and/or previously streamed video in the database 30 may vary and may be updated periodically, as appropriate or necessary. The streaming video and/or previously streamed video may be updated via input from remote input sources and/or devices, such as, for example, from the mobile devices 50 and/or the outlet host device 60.

In various exemplary embodiments, the database 30 and/or any other accessible database (not shown) store software and data used by the systems and/or methods of the present disclosure. The server 20 manages manipulation of the streaming video, reading data from and writing data to the database 30, and or any other accessible database (not shown). The server 20 also drives the transmission of data to and the reception of data from each of the mobile devices 50, the outlet host devices 60, and/or the subsequent viewer devices 70.

In various exemplary, nonlimiting embodiments, the one or more mobile communications base stations 40 comprises a cellular telephone site or tower including antennae and electronic communications equipment, such as, for example, at least one transmitter/receiver, transceiver, digital signal processor, control component, and/or GPS receiver. Together, the one or more mobile communications base stations 40 create a cell or our portions in a cellular communications network. One or more of the mobile communications base stations 40 may comprise a Base Transceiver Station (BTS) as part of a Global System for Mobile Communications (GSM) network.

In various exemplary embodiments, the mobile device 50 comprises at least some of a display 52, which may also function as a touchscreen input device, one or more cameras configured to capture video and/or still images, an audio interface comprising at least one microphone and at least one speaker, one or more device orientation sensors, such as, for example, an internal gyroscope and/or other device orientation sensors, and the requisite hardware and/or software for functional operation of the mobile device 50.

In various exemplary embodiments, the mobile device 50 is equipped with and has the ability to operate using separate microphones for certain of the systems and methods of the present disclosure to take effect. If the mobile device 50 is not equipped with a separate microphones, the audio communications may be shared in the operation of the systems and methods of the present disclosure. If the mobile device 50 is not equipped so as to allow for use of separate microphones and/or speakers, the systems and methods of the present invention allow audio communications to be transmitted via any available microphones and/or speakers, even if the same microphones and/or speakers are utilized to capture video.

In various exemplary embodiments, if the mobile device 50 does not include multiple microphones, a separate or external microphone may optionally be attached or coupled, via wired or wireless connection, to the mobile device 50. In certain exemplary embodiments, the audio associated with the captured video may be captured by an internal microphone of the mobile device 50, while the audio communications between the host and the user may be captured by an attached or coupled separate or external microphone. In these embodiments, when the separate or external microphone is attached or coupled to the mobile device 50, the typical feature of the mobile device 50 (which captures audio from the external microphone and not the internal microphone) is overridden and the mobile device 50 is able to simultaneously capture audio from the internal microphone of the mobile device 50 and the attached or coupled separate or external microphone. Thus, instead of capturing audio from a single microphone, the mobile device 50 is able to simultaneously capture audio from two or more microphones and discriminate between the audio captured by each microphone.

In certain exemplary embodiments, each mobile device 50 includes a memory and processing means. Each mobile device 50 includes a mobile device application (App) stored thereon, the App utilizing the existing audio and video capabilities of the front-end user's mobile device 50, which captures and streams real-time video content of one or more events over the network 10.

In certain exemplary embodiments, the mobile device 50 further comprises at least some of wireless transceiver capabilities, such as, for example, cellular, Bluetooth, or the like for exchanging data over various distances, Global Positioning System (GPS) receiving sensors and/or software for receiving GPS signals and providing geolocation data and data regarding the global position of the mobile device 50.

It should be appreciated that this listing of features and/or elements included in the mobile device 50 are exemplary and not exhaustive. Thus, it should be understood that the mobile device 50, as shown and described, represents only one possible embodiment with one possible combination of features and elements. The features and elements that make up the mobile device 50 and the methods for implementing required and optional software for operation of the mobile device 50, are known in the art. Therefore, a more detailed explanation of the mobile device 50, the constituent components of the mobile device 50, instructions regarding how to incorporate the required and optional elements and/or software into the mobile device 50, methods for implementing apps and software on the mobile device 50, and certain other items and/or techniques necessary for the implementation and/or operation of the various exemplary embodiments of the presently disclosed systems and/or methods are not provided herein because such elements are commercially available and/or such background data will be known to one of ordinary skill in the art. Therefore, it is believed that the level of description provided herein with regard to the mobile device 50 and implementation of the techniques, methods, and/or apparatuses of the present disclosure is sufficient to enable one of ordinary skill in the art to understand and practice the techniques and/or methods, as described.

It should also be appreciated that the systems and/or methods disclosed herein may be implemented as software executing on a mobile electronic device, a programmed general-purpose computer, a special purpose computer, a microprocessor, or the like. In various exemplary embodiments, the systems and/or methods disclosed herein may be implemented as an app residing in a mobile electronic device, a routine embedded in a network client, as a resource residing on a network server, or the like. The systems and/or methods disclosed herein may also be implemented by incorporation into a software and/or hardware system, such as the hardware or firmware systems of a mobile electronic device or the like. In general, any device, capable of implementing the systems and/or methods disclosed herein and that is, in turn, capable of implementing the steps outlined in at least one of the exemplary flowcharts shown in FIGS. 8 and 9, can be used to implement the systems and/or methods disclosed herein.

In various exemplary, nonlimiting embodiments, each of the outlet host devices 60 is optionally a networked computer, a smartphone, a tablet, a personal digital assistant (PDA), a handheld organizer, a television, a smart television, or a similar or hybrid electronic device. Each outlet host devices 60 is utilized by a user (a "video host") wishing to provide video for viewing by one or more subsequent viewer devices 70. This could include broadcast news, print news, news websites, social media websites, networking websites, or individually hosted or controlled websites.

It should be understood that at least one of the outlet host devices 60 may be at least one of a smartphone or tablet, having a memory containing communications software and some form of Internet connectivity, such as a cellular data connection, a WiFi connection, or the like. The Internet connector may optionally be used with the communications software for communication, via the distributed network 10, to the server 20.

In various exemplary embodiments, each of the outlet host devices 60 includes a display and may optionally include one or more input devices. In various exemplary embodiments, the display may be any other known or later developed system capable of displaying data. The one or more input devices may be one or more of a keyboard, a mouse, a touch screen, a touch pad, a stylus, a microphone, a camera, or any other known or later developed device capable of inputting data into the outlet host device 60.

Each of the outlet host devices 60 may also, optionally include at least some of a memory to store video or other data, a processor for rendering video, and a screen to display video.

In various exemplary, nonlimiting embodiments, each of the subsequent viewer devices 70 is optionally a networked computer, a smartphone, a tablet, a personal digital assistant (PDA), a handheld organizer, or a similar or hybrid electronic device. Each subsequent viewer device 70 is utilized by a subscriber or user wishing to view video provided by one or more video hosts 60.

It should be understood that at least one of the subsequent viewer devices 70 may be at least one of a smartphone or tablet, having a memory containing communications software and some form of Internet connectivity, such as a cellular data connection, a WiFi connection, or the like. The Internet connector may optionally be used with the communications software for communication, via the distributed network 10, to the server 20.

In various exemplary embodiments, each of the subsequent viewer devices 70 includes a display and may optionally include one or more input devices. In various exemplary embodiments, the display may be any other known or later developed system capable of displaying data. The one or more input devices may be one or more of a keyboard, a mouse, a touch screen, a touch pad, a stylus, a microphone, a camera, or any other known or later developed device capable of inputting data into the subsequent viewer device 70.

Each of the subsequent viewer devices 70 may also, optionally include at least some of a memory to store video or other data, a processor for rendering video, and a screen to display video.

In various exemplary embodiments, the server 20 is capable of receiving streaming video, geolocation data, and other data from each of the at least one mobile devices 50. The server 20 is also capable of maintaining streaming video, geolocation data, and other data, and transmitting such video and/or other data, via the network, to an appropriate outlet host device 60 and/or subsequent viewer device 70.

Thus, in various exemplary embodiments, each of the mobile device(s) 50, video host(s) 60, and subsequent viewer device(s) 70 is able to access, store, retrieve, and process data from any one or more of the database 30, the distributed network 10, or any other accessible database (not shown). In this manner, it is not essential that any particular data be stored in the database 30. Alternatively, this data can be stored in, for example, the server 20, one or more of the mobile devices 50, video hosts 60, subsequent viewer devices 70, and/or the distributed network 10.

In various exemplary embodiments, the systems and/or methods of the present disclosure will include software and or an App executing on the server 20, one or more of the mobile devices 50, one or more of the video hosts 60, and/or one or more of the subsequent viewer devices 70.

Figure 4:
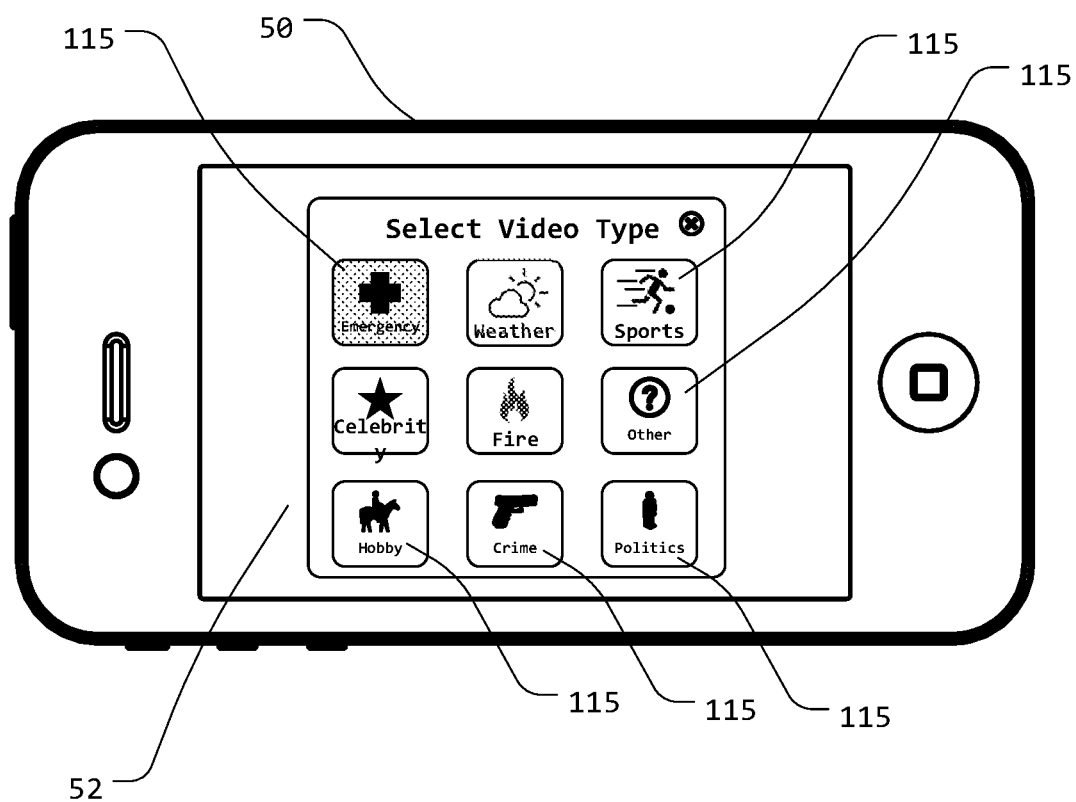
FIG. 4 illustrates an exemplary embodiment of a mobile device being utilized to select a video type or tag, according to the presently disclosed systems and/or methods.
Figure 5:
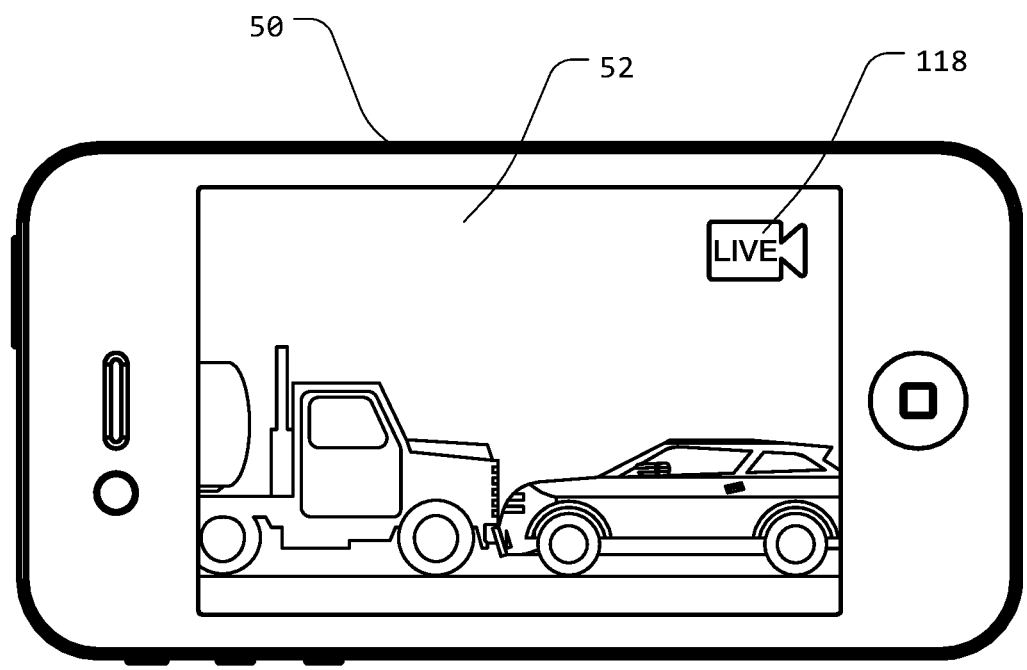
FIG. 5 illustrates an exemplary embodiment of a mobile device being utilized to capture, upload, and/or streaming video, according to the presently disclosed systems and/or methods.
Figure 6:
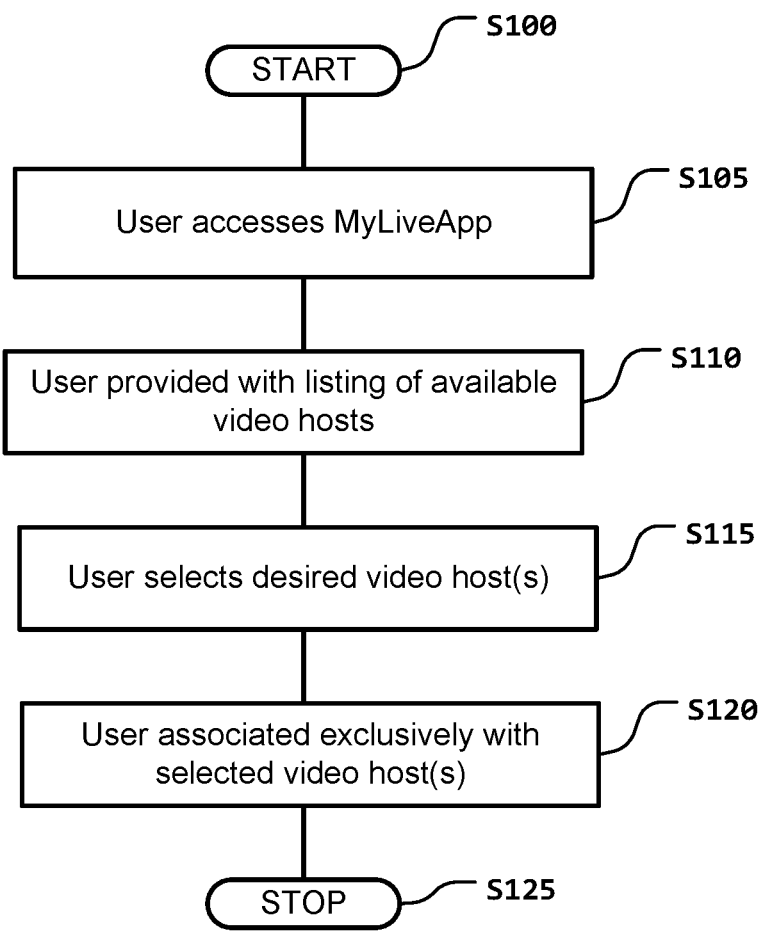
FIG. 6 illustrates an exemplary flowchart outlining exemplary steps for allowing a user to select a media host or outlet for receiving captured, uploaded, and/or streaming video, according to the presently disclosed systems and/or methods.

Utilizing the features and elements of the present disclosure, as illustrated in FIGS. 1-5, and following the exemplary steps shown in FIG. 6, in various exemplary, nonlimiting embodiments of the present disclosure, a front-enduser downloads the App of the present disclosure to the mobile device 50 from, for example, the Google App store, the Apple App store, or another applicable repository of mobile device Apps. As utilized herein, the App utilized to implement the present disclosure may generally be referred to as the "MyLiveApp".

Figure 2:
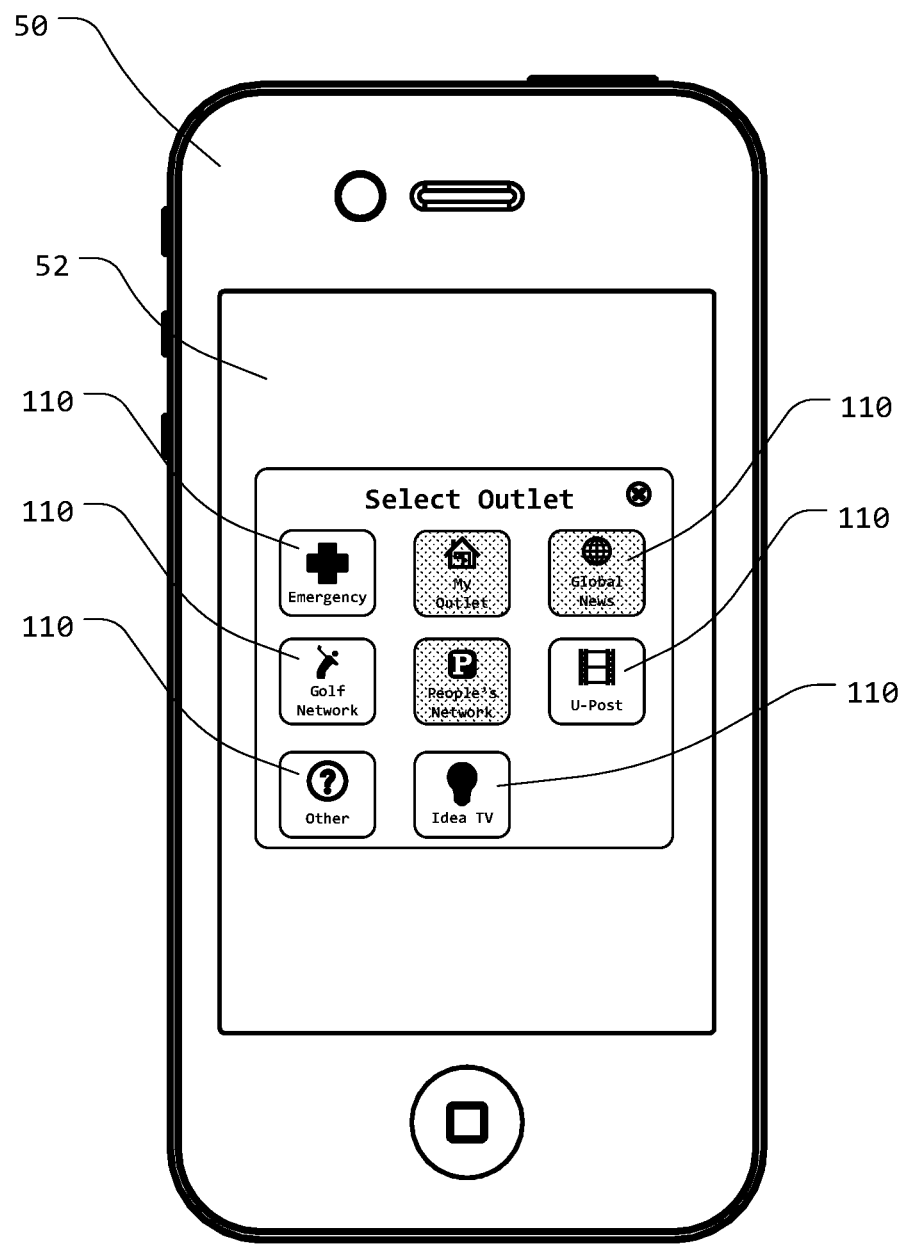
FIG. 2 illustrates an exemplary embodiment of a mobile device being utilized according to the presently disclosed systems and/or methods.

After the user downloads and initially registers the MyLiveApp, the user accesses the MyLiveApp and an exemplary method associated with the present disclosure begins before the user is able to begin capturing the video. As illustrated, the exemplary method begins at step S100 and control continues to step S105, wherein user accesses the MyLiveApp and, in step S110, the MyLiveApp provides the user with a listing of available video hosts. As illustrated most clearly in FIG. 2, the user is presented with a variety of potential video hosts, identified by selectable icons 110, displayed within the display 52 of the mobile device 50. As illustrated in FIG. 2, for exemplary purposes only, the MyLiveApp provides the user with potential video, news, or media hosts or outlets, including an Emergency video host, a My Outlet video host, a Global News video host, a Golf Network video host, a People's Network video host, a U-Post video host, and Other video host, and an Idea TV video host. It should be appreciated that the content and layout of the graphical user interface (GUI) that is utilized to display the selectable icons 110 is a design choice based upon the desired appearance and/or functionality of the GUI. Each of the selectable video hosts represents a video host that is potentially tailored toward a specific genre or type of accessible videos.

Users may optionally select additional video hosts that may be, for example, local or national news broadcasters, or providers of specifically categorized or niche videos. In various exemplary embodiments, the user is optionally able to select "video host" and is then provided with a variety of potential video hosts and/or a method of locating a particular video host for selection.

Once the MyLiveApp provides the user with a listing of available video hosts, the method advances to step S115 and the user is able to select one or more desired video hosts from the one or more available video hosts. Available video hosts are listed in the menu options displayed on the MyLiveApp computer application stored on the user's mobile device 50.

If one or more video hosts are selected, the method advances to step S120 and the user is associated with the selected video host(s) such that the selected video host(s) will be the exclusive recipient(s) of captured video from the user. As illustrated, the user has selected the My Outlet video host, the Global News video host, and the People's Network video host. Thus, when video is captured by the user, using the MyLiveApp, captured video will automatically be streamed or uploaded to the My Outlet video host, the Global News video host, and the People's Network video host. The listing of selected video hosts may be amended or updated, as desired by the user.

In certain exemplary embodiments, the user may optionally establish one or more video hosts, to be associated with a particular event description or tag. In this manner, the user may simultaneously upload or stream video tagged as emergency to an emergency services video host, a local news video host, and a national news video host. Video tagged as hobby or sports may be uploaded or streamed to the user's personal video outlet and a sports video host.

In various exemplary embodiments, selection of a selected video host by the user initiates an approval request to each of the selected video hosts. In these exemplary embodiments, a selected video host must first approve the user's request, before the association between the user and the selected video host takes effect.

When the association between the user and the selected video host(s) is complete, the method continues to step S125, where the method ends and the user is able to capture video and upload or stream the captured video to the selected video host(s), as further described herein.

Figure 3:
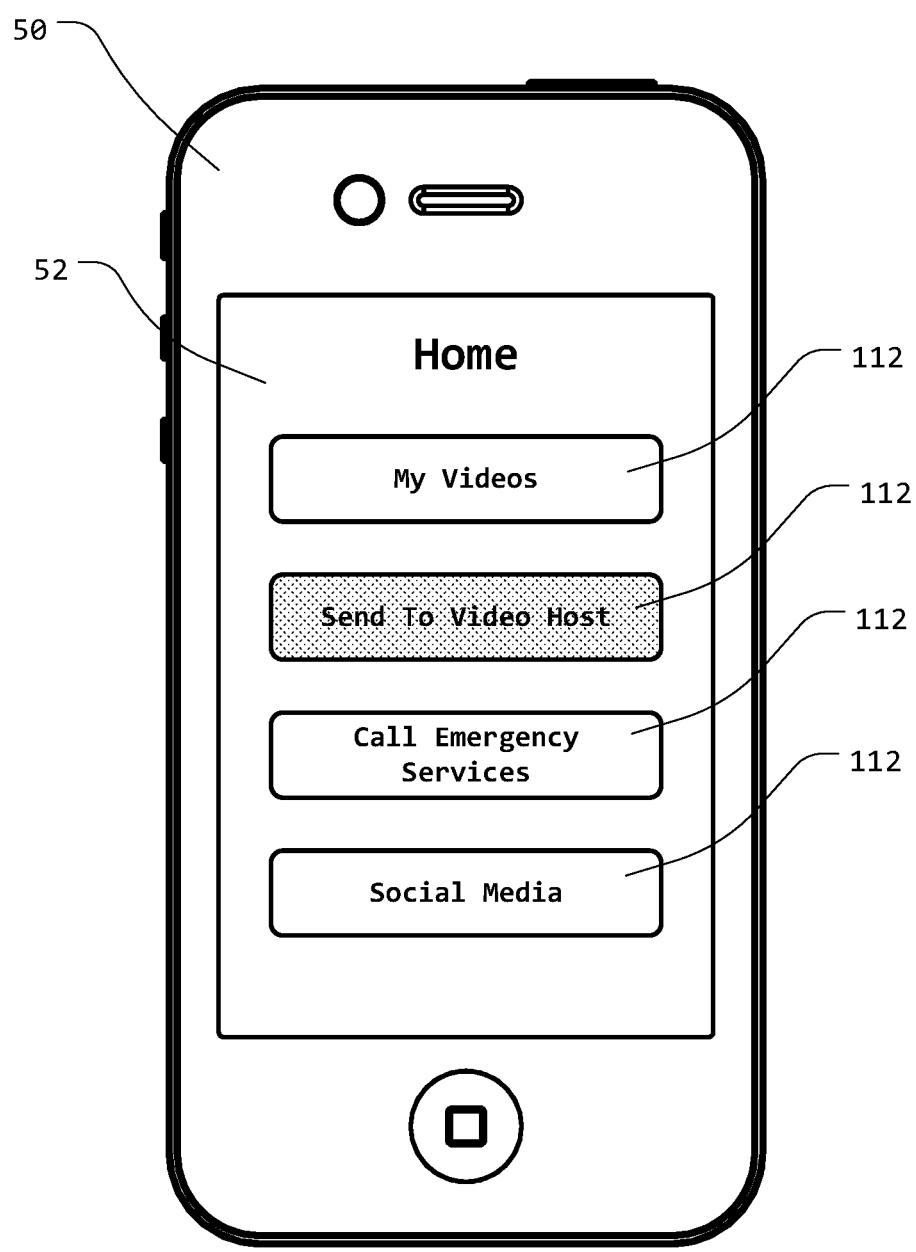
FIG. 3 illustrates an exemplary embodiment of a mobile device being utilized according to the presently disclosed systems and/or methods.
Figure 7:
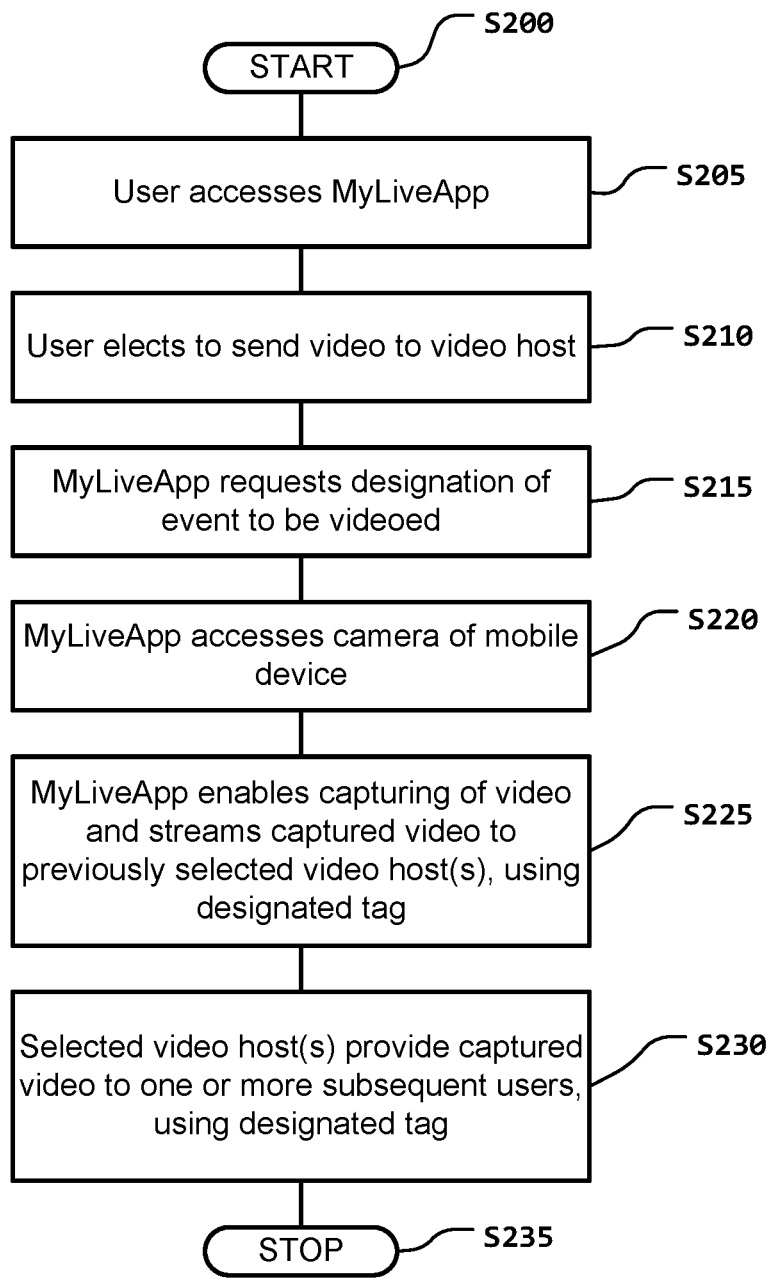
FIG. 7 illustrates an exemplary flowchart outlining exemplary steps for direct video broadcasting through selected video hosts, according to the presently disclosed systems and/or methods.

When the association between the user and the selected video host(s) is complete, the user is able to capture video and upload or stream the captured video to the selected video host(s), utilizing the features and elements of the present disclosure. As illustrated in FIGS. 1-5, and following the exemplary steps shown in FIG. 7, in various exemplary, nonlimiting embodiments of the present disclosure, the exemplary method begins at step S200 and control continues to step S205, wherein, if a user accesses the MyLiveApp a HOME menu, as illustrated in FIG. 3, is provided from which the MyLiveApp user has the option of choosing from selectable icons 112, representing optional features provided by the MyLiveApp.

As illustrated, at least some of the provided features may include, for example, My Videos, Send to Video Host, Call Emergency Services, or Social Media. If, in step S110, the user chooses determined selectable icon 112, such as, for example, "Send to Video Host" the method advances to step S215 and, as illustrated in FIG. 4, the MyLiveApp displays a graphical user interface within the display 52, providing the user with a plurality of choices of video types by which to categorize or tag the event the user is about to video and stream. In an illustrative, nonlimiting embodiment, as illustrated in FIG. 4, the MyLiveApp provides a plurality of selectable icons, to allow the user to tag the event as an emergency event, weather event, sports event, celebrity related event, fire, other event, hobby event, crime, or political event. It should be appreciated that these are merely exemplary tags and that the number and type of presented tags is a design choice. It should also be appreciated that the user may be offered the option of creating designation or tag for the event.

Once a tag for the event has been selected, the method advances to step S220 and the MyLiveApp accesses the camera of the mobile device 50. Once the camera of the mobile device 50 has been accessed, the method advances to step S225 and the MyLiveApp enables the capturing of video by the mobile device 50, as illustrated, for example, in FIG. 5. The captured video is uploaded or streamed to be recorded to either a cloud database storage or other recordable medium, and streamed live to the previously selected video host(s).

As illustrated in FIG. 4, the user has designated a video type as an "emergency", using a selectable icon 115. Once the designation has been entered, the video capture feature of the camera of the mobile device 50 is accessed and, as illustrated in FIG. 5, the video of the accident is captured and streamed to at least one previously selected video host, using the designated tag of "emergency".

In various exemplary embodiments, as illustrated in FIG. 5, while video is being captured and streamed, a "Streaming to LIVE" or "LIVE" icon 118 is displayed within the display 118 to indicate that to the user that the currently captured video is being streamed to the selected video host(s). In certain exemplary embodiments, the captured video is provided to each selected video host, together with the tag information and optionally certain geolocation information, identifying the geographic location where the video is being captured.

The method then optionally advances to step S230, wherein the captured video is provided to one or more of the subsequent users, via the subsequent user devices 70. In certain exemplary embodiments, the captured video is provided to the subsequent users, based on the designated tag or category identified by the user. In this manner, subsequent users may access and view captured video, based on the desired categories or tags.

When the user discontinues the video capture and video upload or streaming (or the video is optionally provided to one or more of the subsequent users), the method continues to step S230, where the method ends.

In various exemplary embodiments, the systems and/or methods of the present disclosure provide a back-end web interface, which allows the video host 60 to operate in accordance with the systems and/or methods of the present disclosure. As utilized herein, the web interface may generally be referred to as "CamCaster Control Room". In various exemplary embodiments, CamCaster Control Room communicates and corresponds over the distributed network 10 with the one or more mobile devices 50, using the MyLiveApp to receive and stream the real-time video content for broadcast purposes directly to one or more subsequent viewers, each utilizing a subsequent viewer device 70. The video content can also be recorded in the mobile device's 50 memory, in an archived cloud database, such as, for example, the database 30, or in another computer readable medium.

Figure 8:
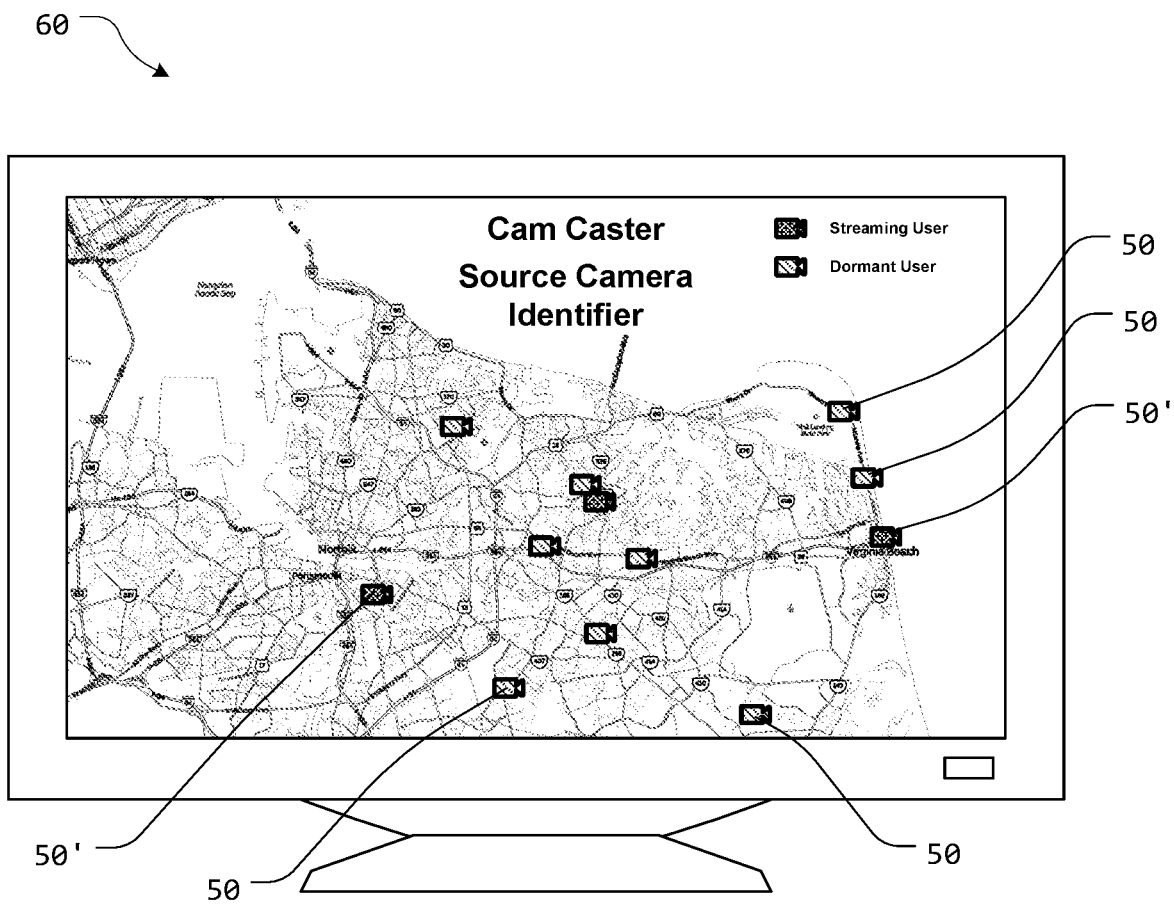
FIG. 8 illustrates an exemplary embodiment of a video host interface, displayed on an outlet host device, according to the presently disclosed systems and/or methods.

Through the CamCaster Control Room, a video host can view the video content being captured, uploaded, and/or recorded by each associated user. In various exemplary embodiments, as illustrated in FIG. 8, the CamCaster Control Room may provide the outlet host device 60 with a display including graphical representations of a selected geographic area, together with graphical representations of each mobile device 50 within the geographic area. In certain exemplary embodiments, the display provides a graphical representation of each mobile device 50 that is currently dormant or not capturing video within the MyLiveApp. Any each mobile device 50 that is currently capturing video, via the MyLiveApp, is also displayed as a graphical representation of a mobile device 50'. By selecting a given mobile device 50', the CamCaster Control Room allows the outlet host device 62 display the video currently being captured, by that given device 50', via the MyLiveApp.

Figure 9:
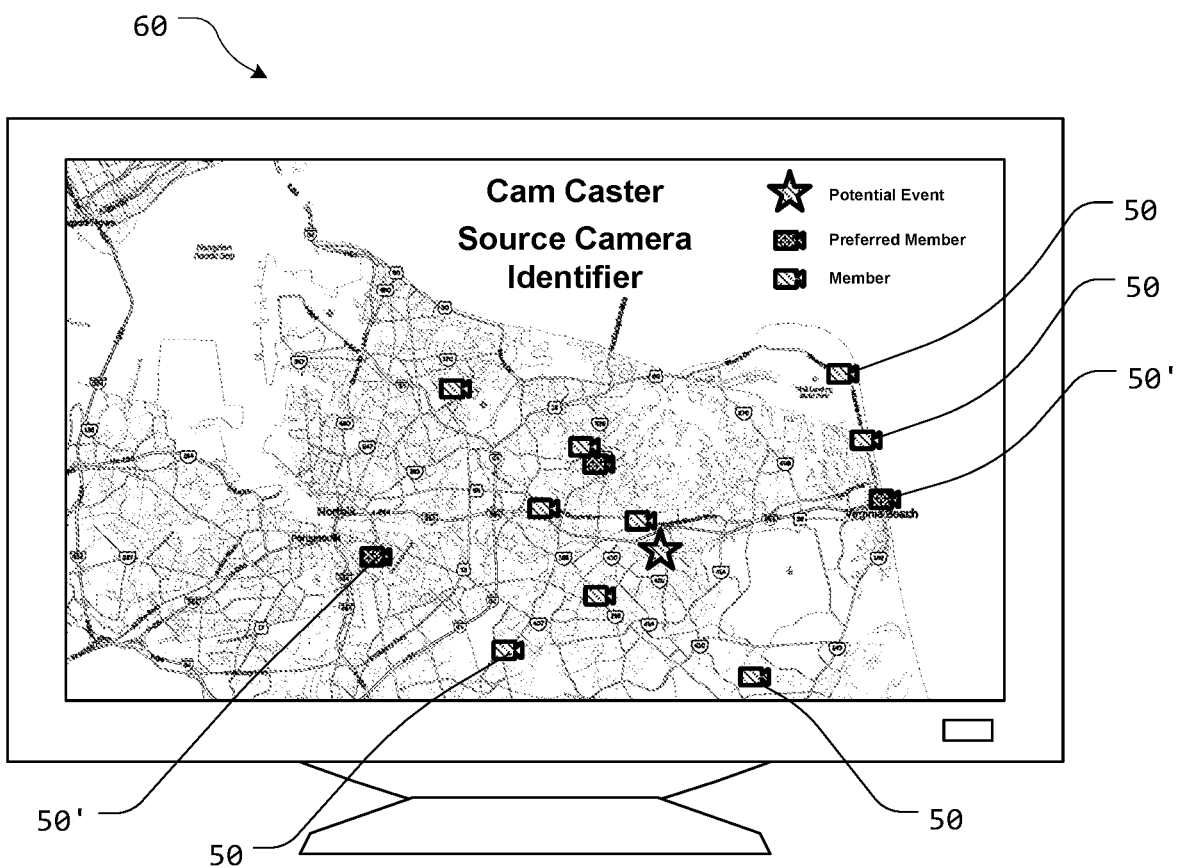
FIG. 9 illustrates an exemplary embodiment of a video host interface, displayed on an outlet host device, according to the presently disclosed systems and/or methods.

As illustrated in FIG. 9, the CamCaster Control Room may optionally allow a video host to view, via the outlet host device 60, the geographic location of mobile devices 50, within a given geographic area. As illustrated, for example, if the video host is aware of an event or potential event, the location of the event or potential event can be identified on a map representing the geographic area. The video host is then able to send requests to each mobile device 50 within the geographic area to request that video be captured using the MyLiveApp, for use by the outlet host device 60.

In certain exemplary embodiments, users are members can be identified as preferred or standard users or members. In certain exemplary embodiments, the representation of each mobile device 50 may optionally represent a geographic location of preferred users (as mobile devices 50') and standard users (as mobile devices 50). In this manner, the video host may optionally send requests to only preferred users and not standard users.

In certain exemplary embodiments, video host are able to contact a user, while the user is utilizing the MyLiveApp, directly, via a live call or texting pallet interface within the CamCaster Control Room dashboard. In this manner, the video host is optionally able to acquire or provide further information to the user and/or verify that video content being uploaded or streamed. Upon verification, the video host may decide whether the video stream is to be broadcast live or recorded to, for example, the database 30 for later processing and/or distribution to subsequent viewers, via subsequent viewer devices 70.

The decision of the video host may optionally be passed on to the user via the CamCaster Control Room via text or voice communications, utilizing the CamCaster Control Room and the MyLiveApp. If the video footage is to be streamed live, the video host may optionally query the user concerning information about the event and direct the user as to framing of the video content and gives them a "Stand by" directive. When the video is being viewed or sent to broadcast a "LIVE" indicator in the user's display 52 is illuminated.

In various exemplary, nonlimiting embodiments, the MyLiveApp user can capture and transmit live audio and video streams, via a mobile device, to a CamCaster Control Room recipient. The mobile device transmits the video (comprising both audio and video) by using the one or more microphones of the mobile device. Simultaneously, with the one-way transmission of the video (comprising audio and video) to a CamCaster Control Room recipient, the CamCaster Control Room control person can initiate a Voice-Over-IP ("VoIP") audio communication to or with the MyLiveApp user. The VoIP audio communication to or with the MyLiveApp user is separate and apart from the audio included in the recorded or streamed video. Thus, the VoIP audio communication to or with the MyLiveApp user is not part of the original video transmission (comprising the audio and video from the captured or streamed video).

So long as the mobile device is equipped to have different microphone and/or line inputs, systems and methods of the present disclosure separate VoIP audio from a simultaneous audio/video being captured and/or streamed.

In various exemplary, nonlimiting embodiments, the VoIP audio communication to or with the MyLiveApp user is a private communication.

In various exemplary, nonlimiting embodiments, the VoIP audio communication to or with the MyLiveApp user may optionally be a one way communication (from the CamCaster Control Room control person to the MyLiveApp user) or may optionally be a two way communication (between the CamCaster Control Room control person and the MyLiveApp user).

In various exemplary, nonlimiting embodiments, the VoIP audio communication to or with the MyLiveApp user may optionally be done through a wired headset or a wireless bluetooth device with a speaker only or with a speaker and a microphone.

In various exemplary, nonlimiting embodiments, the VoIP audio communication to or with the MyLiveApp user can be done through the mobile device's front speaker, bottom "speakerphone" speaker, or other attached or wireless speaker.

Figure 10:
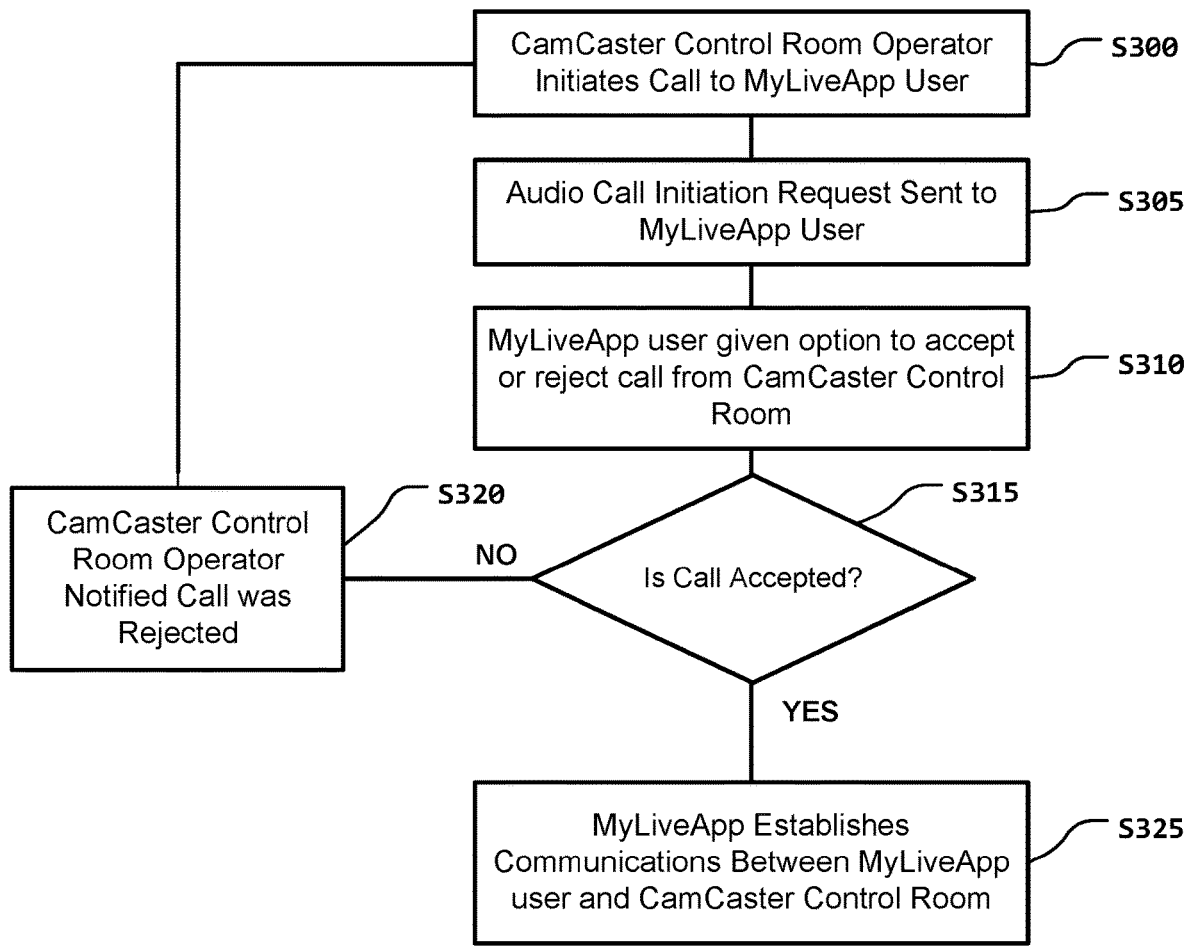
FIG. 10 illustrates an exemplary flowchart outlining exemplary steps for allowing a user to upload video to a media host or outlet with audio feedback, according to the presently disclosed systems and/or methods.
Figure 15:
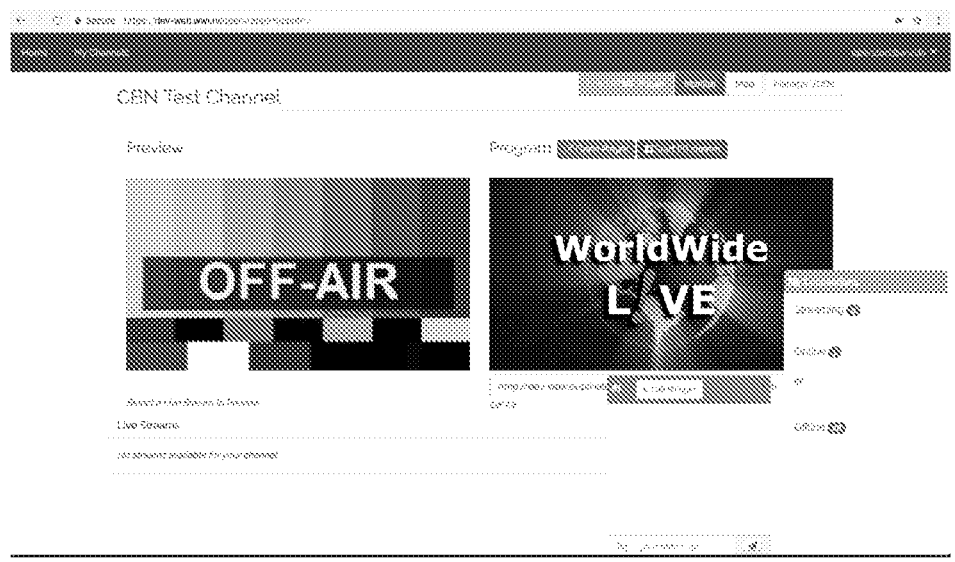
FIG. 15 illustrates an exemplary embodiment of a graphical user interface displayed for a media host or outlet being used to receive uploaded video from a mobile device, according to the presently disclosed systems and/or methods.

Following the exemplary steps shown in FIG. 10, in various exemplary, nonlimiting embodiments of the present disclosure, the exemplary method begins at step S300, wherein a CamCaster Control Room operator initiates a communication or VoIP call to a MyLiveApp user. In certain exemplary embodiments, audio communications are always initiated by the CamCaster Control Room operator, via the CamCaster Control Room. In various exemplary embodiments, this is accomplished by the CamCaster Control Room operator utilizing the CamCaster Control Room dashboard or graphical user interface to select a determined MyLiveApp user and selecting "Call", as illustrated in FIG. 15. FIG. 15, further illustrates an exemplary screenshot from the dashboard or graphical user interface. When someone on the dashboard wishes to initiate a VoIP call, they look for an available MyLiveApp user, referred as "fff" in the exhibit, they click on the icon representing the user, and, for example, click "call stringer".

Figure 16:
FIG. 16 illustrates an exemplary embodiment of a graphical user interface displayed for a media host or outlet being used to request receipt of uploaded video from a mobile device user, according to the presently disclosed systems and/or methods.

FIG. 16 further illustrates a portion of the dashboard or graphical user interface illustrated in FIG. 15, wherein the name "Dani" is identified as the selected MyLiveApp user.

In response to the call initiation by the CamCaster Control Room, the method advances to step S305, wherein a request to initiate a VoIP call is sent to the selected MyLiveApp user.

Figure 11:
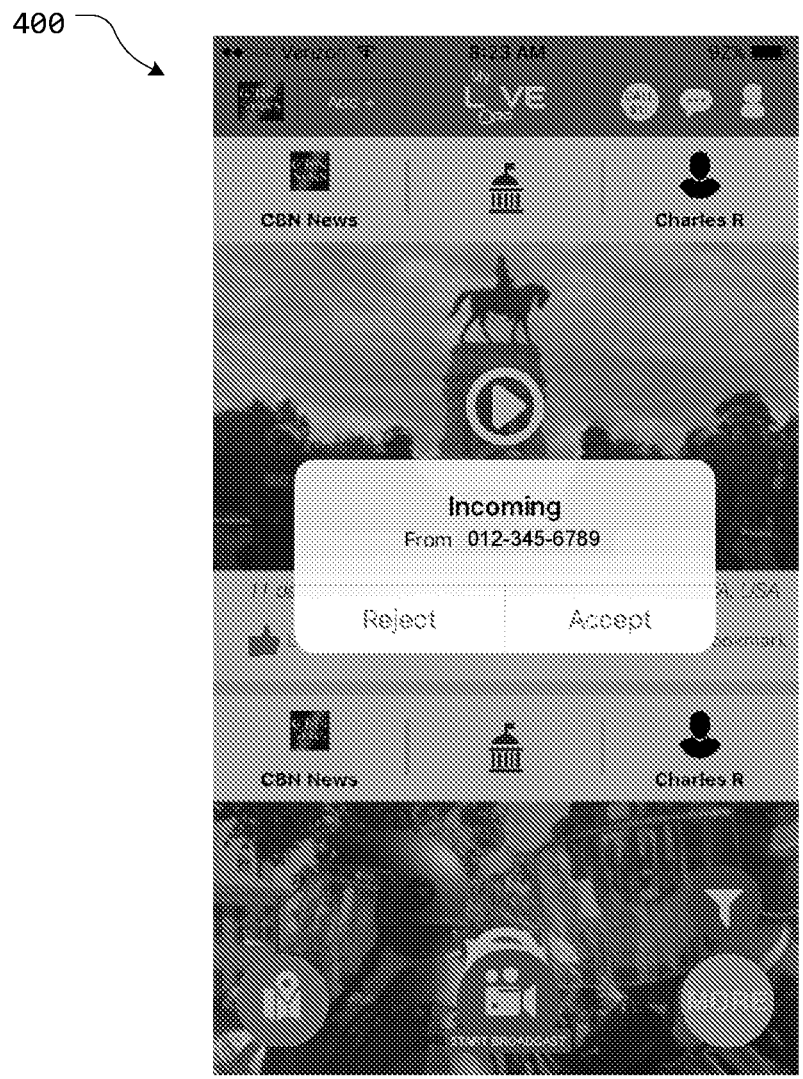
FIG. 11 illustrates an exemplary embodiment of a graphical user interface displayed on a mobile device being utilized to upload video to a media host or outlet, according to the presently disclosed systems and/or methods.

If the MyLiveApp user receives the call or invitation, via the MyLiveApp, the MyLiveApp will "ring" and, in step S310, the MyLiveApp user is given the option to answer or reject the call from the CamCaster Control Room and the method advances to step S315. In various exemplary embodiments, an exemplary graphical user interface 400 of the MyLiveApp presents a set of two selectable buttons or icons, allowing the MyLiveApp user to "answer" or "reject" the initiated call, as illustrated in FIG. 11. As further illustrated in FIG. 11, a MyLiveApp user has received a prospective VoIP call and is able to accept or reject the received call.

If, in step S315, it is determined that the MyLiveApp user rejects the VoIP call, the method advances to step S320, wherein the VoIP call is rejected and the CamCaster Control Room operator is notified that the call was rejected and the method may optionally return to step S300, wherein the a CamCaster Control Room operator may reinitiate a communication or VoIP call to a MyLiveApp user.

Otherwise, if it is determined, in step S315, that the MyLiveApp user accepts the call, then the method advances to step S325, and a VoIP communication is established between the MyLiveApp user and the CamCaster Control Room operator. Once the VoIP communication is established, the CamCaster Control Room can audibly communicate with the MyLiveApp user, using the microphone and speaker available on the computer running the CamCaster Control Room.

Once the communication is established, the MyLiveApp user can audibly communicate with the CamCaster Control Room operator using one of the available audio communication ports available on the mobile device, for example, on a wired headset or a wireless Bluetooth headset.

Once the MyLiveApp user has accepted a VoIP call, no matter which page of the MyLiveApp that the user has navigated to, new buttons labeled "Hang Up" and "Output" will appear. Hang Up will terminate the VoIP call, while Output will allow the MyLiveApp user to select or change the particular input and output for the private communication with the CamCaster Control Room operator.

If the MyLiveApp is closed when the CamCaster Control Room operator attempts to establish a VoIP call, the MyLiveApp will still ring and query the user to accept or reject the VoIP call.

Figure 12:
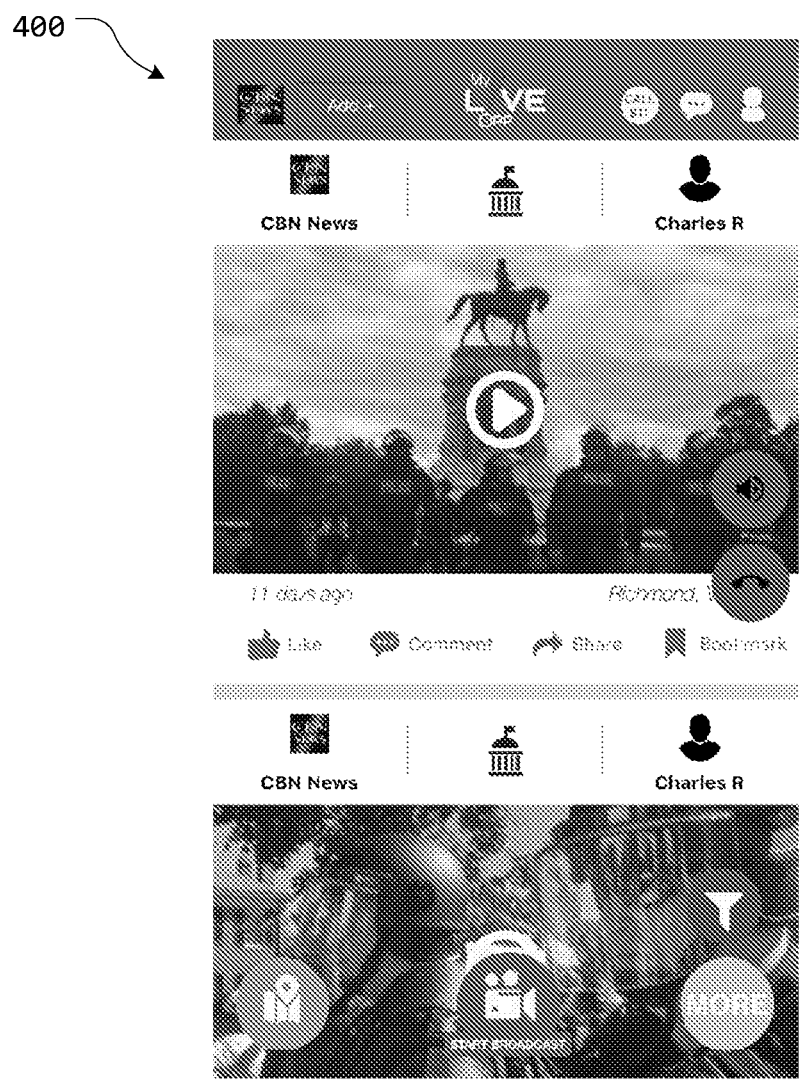
FIG. 12 illustrates an exemplary embodiment of a graphical user interface displayed on a mobile device being utilized to upload video to a media host or outlet, according to the presently disclosed systems and/or methods.

As illustrated in FIG. 12, the MyLiveApp user has accepted the call and one or more icons appear at the right, which remain until the call is terminated. These icons allow the user to terminate the VoIP call or change the output of the VoIP call.

Figure 13:
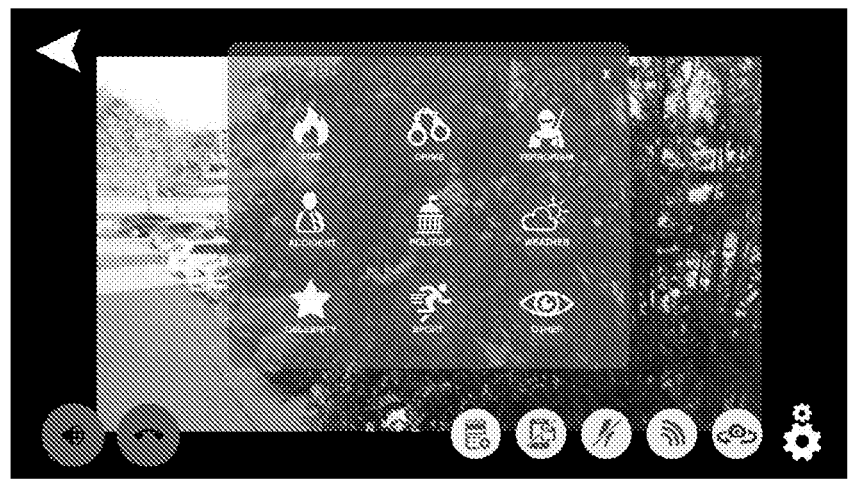
FIG. 13 illustrates an exemplary embodiment of a graphical user interface displayed on a mobile device being utilized to upload video to a media host or outlet, according to the presently disclosed systems and/or methods.

As illustrated in FIG. 13, the MyLiveApp user has now turned their mobile device horizontally, while remaining on the VoIP call, and the MyLiveApp user is preparing to shoot live video—perhaps at the direction of the CamCaster Control Room operator on the VoIP call. In various exemplary embodiments, the MyLiveApp user must select the category for the video he or she is about the shoot.

Figure 14:
FIG. 14 illustrates an exemplary embodiment of a graphical user interface displayed on a mobile device being utilized to upload video to a media host or outlet, according to the presently disclosed systems and/or methods.

As illustrated in FIG. 14, the MyLiveApp user is now shooting live video (as indicated by the "streaming" text at the top). The VoIP is also live, while the video is streaming (as indicated by the icons at the bottom left).

By way of example and not limitation, during use, a MyLiveApp user may receive, via a mobile device, a call from the CamCaster Control Room operator. If the MyLiveApp user answers the call, using a separate wired or Bluetooth device headset, the VoIP communication back and forth is via the separate wired or Bluetooth device headset. The MyLiveApp user may then be directed, via the audio communication, to start streaming video to the CamCaster Control Room. The audio that goes along with the live video will be picked up from the microphone of the mobile device and not from the wired or Bluetooth headset microphone. The wired or Bluetooth headset microphone will only be used for audio communications between the CamCaster Control Room operator and the MyLiveApp user.

By way of further example, the MyLiveApp user begins filming a live event and a CamCaster Control Room operator sees the live audio and video feed from the MyLiveApp user and desires to communicate with the MyLiveApp user, either before or after broadcasting the live video feed of the event from user. The CamCaster Control Room operator may initiate a VoIP call with the MyLiveApp user, perhaps to establish credibility, request that the MyLiveApp user change positions, pan, zoom, or otherwise better frame the live event, etc. These communications between the MyLiveApp user and the CamCaster Control Room operator are not made part of the live feed of the particular event.

In still another example, the MyLiveApp user is not filming a live event and not even using the MyLiveApp at the particular moment, but the user's location is being reported to a CamCaster Control Room operator. The CamCaster Control Room operator may establish a VoIP call to the MyLiveApp user to request that the MyLiveApp user begin filming a live event near the geographic proximity of the MyLiveApp user. In this case, the MyLiveApp user may continue the communication with the CamCaster Control Room operator privately, while simultaneously filming the live event for the CamCaster Control Room operator and providing the video to the CamCaster Control Room.

If communications are provided between the video host and user, the user may, for example, continue to capture video content until instructed otherwise. Optionally, the video host, live studio news anchors, reporters, or the like may interview the user during capturing of the live video content.

The video host places the video content stream live on the air via the CamCaster Control Room.

If the video stream is not utilized for live broadcast, the video may optionally be recorded and stored, too, for example, the database 30 under the video host's supervision until the news event ends and will become available for use later on as Video On Demand (VOD).

Subsequent viewers, via subsequent viewer devices 70 are able to access and view videos, provided by video hosts, via the outlet host device 60. In various exemplary embodiments, subsequent viewers are able to view listings of live stream cameras according to category or tag. Subsequent viewers are also able to utilize location and/or geolocation filtering, title and descriptive information to filter and view video content, provided by the video hosts, via the outlet host devices 60.

In various exemplary embodiments, the MyLiveApp is a News Delivery/Emergency Services/Social Media notification oriented application for mobile devices 50 with video streaming and capturing capabilities. The application is designed to operate with any mobile device 50 as known in the art. In various exemplary embodiments, the geolocation information regarding each of the mobile devices 50 provides the ability for video hosts to contact users and solicit bids to capture livestreamed video for news coverage. Alternatively, users may optionally receive bids to capture livestream video for video hosts. These users can turn their availability on and off which changes their icon on the camera map from available to not available.

The MyLiveApp, comprises certain optional capabilities, not all of which independently or in combination must be utilized in order carry out the systems and/or methods of the present disclosure.

In various exemplary, nonlimiting embodiments, the MyLiveApp separately and optionally provides the ability to record and stream live video at multiple bit rates to the server 20, provide push notifications to pre-designated users, when a video stream is started, support live streaming from other camera devices, such as GoPro Hero® cameras or drones, via present and future smart mobile device 50 connections.

The MyLiveApp separately and optionally provides the ability to access phone location services and share location, to see news & Social Media Content on map using live map features, to manage contacts, to view personal and saved videos on a server via smart devices and web browsers, to enable video hosts' graphic branding and customization of the overall application and its pages, to integrate a chat (texting) and voice component permitting users to chat with video hosts.

The MyLiveApp separately and optionally provides the ability to list and view live and video on demand (VOD) videos as chosen via a type-filter or by date and time filter. This content may be limited to videos shot for the particular "favorite" news connection chosen by the user.

The MyLiveApp separately and optionally provides the ability for the user to choose a video host in the form of a broadcaster or web page organization to send their news feed, to be provided with admin settings allowing users to update & modify their generally applicable personal information & set up the MyLiveApp's features, to connect with and send notices, alerts and content to other social media Apps & outlets, to categorize/label news into a specific category prior to recording & streaming, to give users Multiple choices of News and Emergency Type: Fire, Accident, War, Crime, Weather, Politics, Celebrities, Sports, Other; which then activates the cellphone camera.

The MyLiveApp separately and optionally provides for 2-way voice communication between the application user and the video host or receiving end of a video stream via a back-end interface. In various exemplary embodiments, the MyLiveApp can interact with a corresponding website to a payment Gateway for the users to subscribe to and purchase services.

The MyLiveApp separately and optionally provides auto and manually set streaming with different video and audio quality. In various exemplary embodiments, the user has the ability to turn the microphone on/off via the icon depicted as a microphone.

The MyLiveApp separately and optionally provides for remote control of camera light, zoom, and front and back camera switching features from the CamCaster Control Room web interface and for metadata recording and presentation in various location throughout the MyLiveApp and CamCaster Control Room: Name, Location, Date, Time, Length, Title, and Description.

In various exemplary embodiments, the MyLiveApp allows video hosts to directly solicit and hire users who are nearby news events in order to capture and stream video content.

In various exemplary embodiments, the MyLiveApp allows video to be uploaded and/or streamed at multiple bit rates and supports live streaming from other video sources, such as GoPro Hero® cameras video a Bluetooth or similar connection. Notably, if the other video source device connected has an internal gyroscope that can be used to determine if such video source device is horizontal or vertical.

Figure 17:
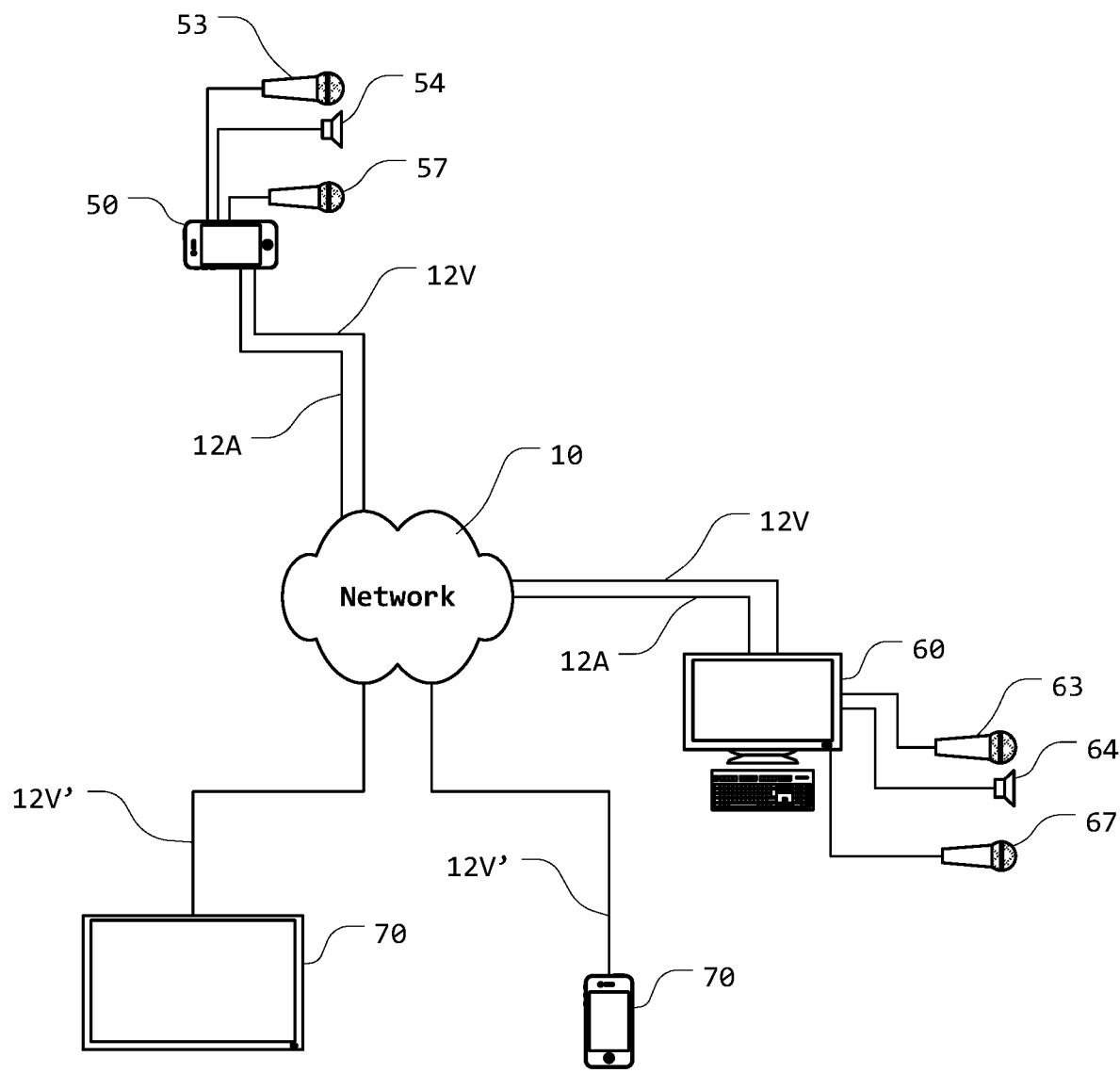
FIG. 17 illustrates a functional block diagram outlining an exemplary embodiment of the exemplary systems, methods, and/or apparatuses, according to the present disclosure.

FIG. 17 illustrates a functional block diagram outlining certain components of an exemplary embodiment of the systems and/or methods of the present disclosure. As illustrated in FIG. 17, in various exemplary, nonlimiting embodiments, the present disclosure utilizes at least some of a distributed network 10, linked connection(s) 12, one or more mobile devices 50, at least one outlet host device 60, and at least one subsequent viewer device 70.

It should be understood that each of these elements corresponds to and operates similarly to the distributed network 10, the linked connection(s) 12, the one or more mobile devices 50, the at least one outlet host device 60, and the at least one subsequent viewer device 70, as described above with reference to FIG. 1 and following. It should be understood that the components illustrated in FIG. 17 may optionally be utilized in connection with at least the server 20, the memory or database 30, and/or the one or more mobile communications base stations 40, as also described above with reference to FIG. 1 and following.

However, FIG. 17 further illustrates the inclusion, incorporation, or utilization of at least certain microphones and/or speakers associated with the mobile device 50 and the host device 62 facilitate two-way communication between the MyLiveApp user (mobile device 50 user) and the CamCaster Control Room operator (host device 60 operator).

As illustrated, the systems and/or methods of the present disclosure optionally utilize various microphones and/or speakers of the mobile device 50 and various microphones and/or speakers of the host device 60 to provide audio communications between the CamCaster Control Room operator and the MyLiveApp user. For example, audio communications between the CamCaster Control Room operator and the MyLiveApp user may be provided, via the mobile device 50, by one or more of a first mobile device input microphone 53 and a mobile device output speaker 54. Similarly, audio communications between the CamCaster Control Room operator. and the MyLiveApp user may be provided, via the host device 60, by one or more of a first host device input microphone 63 and a host device output speaker 64.

In various exemplary embodiments, the first mobile device input microphone 53 and the mobile device output speaker 54 may optionally be a microphone and/or speaker resident in the mobile device 50. Alternatively, the first mobile device input microphone 53 and the mobile device output speaker 54 may optionally be a separate wired or wireless device headset. The linked audio connection 12A may optionally be a VoIP connection.

Thus, it should be appreciated that the first mobile device input microphone 53, the mobile device output speaker 54, and the second mobile device input microphone 57 may optionally comprise one or more microphones and/or speakers resident in the mobile device 50 or may be external devices attached or coupled to the mobile device 50 via a wired or wireless connection. In certain exemplary, nonlimiting embodiments, the first mobile device input microphone 53 and the second mobile device input microphone 57 may comprise the same microphone and the audio associated with the captured video may include audio communications between the CamCaster Control Room operator and the MyLiveApp user.

Audio associated with the video that is being captured and uploaded or streamed from the mobile device 50 may be provided by a second mobile device input microphone 57. The second mobile device input microphone 57 may optionally be a microphone and/or speaker resident in the mobile device 50. Alternatively, the second mobile device input microphone 57 may optionally be a separate wired or wireless microphone attached or coupled to the mobile device 50. The second mobile device input microphone 57 is the microphone utilized to capture audio associated with the captured video. The audio associated with the captured video is transmitted to the host device 60, together with the captured video, via the linked video connection 12V.

In various exemplary embodiments, the first host device input microphone 63 and the host device output speaker 64 may optionally be a microphone and/or speaker resident in the host device 60. Alternatively, the first host device input microphone 63 and the host device output speaker 64 may optionally be a separate wired or wireless device headset. The second host device input microphone 67 may optionally be a microphone and/or speaker resident in the host device 60. Alternatively, the second host device input microphone 67 may optionally be a separate wired or wireless microphone attached or coupled to the host device 60.

Thus, it should be appreciated that the first host device input microphone 63, the host device output speaker 64, and the second host device input microphone 67 may optionally comprise one or more microphones and/or speakers resident in the host device 60 or may be external devices attached or coupled to the host device 60 via a wired or wireless connection. In certain exemplary, nonlimiting embodiments, the first host device input microphone 63 and the second host device input microphone 67 may comprise the same microphone and the audio associated with the video uploaded or streamed to the viewer devices 70 may include the original audio associated with the captured video, optionally the audio communications between the CamCaster Control Room operator and the MyLiveApp user, and additional audio provided by the host device 60.

In various exemplary, nonlimiting embodiments, additional audio associated with the video that is being uploaded or streamed from the host device 60 to various viewer devices 70 may be provided by the second host device input microphone 67. The second host device input microphone 67 is the microphone utilized to capture audio, such as audio commentary by the host device 60, which will be included or associated with the captured video, when the captured video is uploaded or streamed from the host device 60 to viewer devices 70. Any additional audio associated with the captured video is transmitted from the host device 60 to the viewer devices 70, together with the originally captured audio and video, via the linked video connection 12V'.

The linked audio connection(s) 12A and/or the linked video connection(s) 12V and/or 12V' may be any known or later developed device or system for connecting at least some of the mobile device(s) 50, the video host(s) 60, including a direct wired connection, a connection over a LAN, a WAN, or any other distributed network, a connection over the public switched telephone network, a connection over a cellular data connection, an Internet connection, a Bluetooth connection, a WiFi connection, a connection over a cellular telephone network, a VoIP connection, a satellite connection or the like. In general, the linked audio connection(s) 12A and/or the linked video connection(s) 12V and/or 12V' may be any known or later developed connection system or structure usable to connect at least the mobile device(s) 50 and the video host(s) 60, including both wired and wireless connections.

Thus, during use, audio communications may optionally be transmitted and received between the CamCaster Control Room operator (host device 60 operator) and the MyLiveApp user (mobile device 50 user) via the linked audio connection 12A. Audio associated with the video that is being captured and uploaded or streamed is transmitted from the MyLiveApp user to the CamCaster Control Room operator is transmitted from the mobile device 50 to the host device 60, via the linked video connection 12V, which is separate and distinct from the linked audio connection 12A.

In this manner, when a MyLiveApp user starts a live video and audio stream, the software provides access to the audio and video inputs of the mobile device 50 for purposes of transmitting the live video and audio feed, via the linked video connection 12V. However, simultaneously while streaming said video and audio, via the linked video connection 12V, the MyLiveApp creates a multi-channel audio access that allows the first mobile device input microphone 53 and optionally the second mobile device input microphone 57, to connect, via the linked audio connection 12A (such as, for example, a second initiated VoIP network) back to the CamCaster Control Room. With this multi-channel audio access, the one-way or two-way separate audio communication does not interrupt the simultaneous live video audio transmission.

In certain exemplary embodiments, the audio communications, via the linked audio connection 12A, allow, for example, the MyLiveApp user to receive instructions and/or comments from the CamCaster Control Room operator, without interfering with the audio associated with the captured video.

While the presently disclosed systems and/or methods has been described in conjunction with the exemplary embodiments outlined above, the foregoing description of exemplary embodiments of the presently disclosed systems and/or methods, as set forth above, are intended to be illustrative, not limiting and the fundamental disclosed systems and/or methods should not be considered to be necessarily so constrained. It is evident that the presently disclosed systems and/or methods is not limited to the particular variation set forth and many alternatives, adaptations modifications, and/or variations will be apparent to those skilled in the art.

It is to be understood that the phraseology of terminology employed herein is for the purpose of description and not of limitation. Unless defined otherwise, all technical and scientific terms used herein have the same meaning as commonly understood by one of ordinary skill in the art to which the presently disclosed systems and/or methods belongs.

In addition, it is contemplated that any optional feature of the inventive variations described herein may be set forth and claimed independently, or in combination with any one or more of the features described herein.

Accordingly, the foregoing description of exemplary embodiments will reveal the general nature of the presently disclosed systems and/or methods, such that others may, by applying current knowledge, change, vary, modify, and/or adapt these exemplary, non-limiting embodiments for various applications without departing from the spirit and scope of the presently disclosed systems and/or methods and elements or methods similar or equivalent to those described herein can be used in practicing the presently disclosed systems and/or methods. Any and all such changes, variations, modifications, and/or adaptations should be and are intended to be comprehended within the meaning and range of equivalents of the disclosed exemplary embodiments and may be substituted without departing from the true spirit and scope of the presently disclosed systems and/or methods.

Also, it is noted that as used herein and in the appended claims, the singular forms "a", "and", "said", and "the" include plural referents unless the context clearly dictates otherwise. Conversely, it is contemplated that the claims may be so-drafted to require singular elements or exclude any optional element indicated to be so here in the text or drawings. This statement is intended to serve as antecedent basis for use of such exclusive terminology as "solely", "only", and the like in connection with the recitation of claim elements or the use of a "negative" claim limitation(s).

What is claimed is:

1. A method for direct video broadcasting to one or more selected media host(s) or outlet(s), via a mobile device, comprising:
    associating said mobile device with one or more media host(s) or outlet(s), such that said one or more media host(s) or outlet(s) will be recipient(s) of live stream video from said mobile device;
    allowing said user to live stream video, via said mobile device, and provide said live stream video to said one or more media host(s) or outlet(s), wherein a host of said one or more media host(s) or outlet(s) is enabled to engage in live two-way audio communications with said user, via said mobile device, as said live stream video is being captured, wherein said live two-way audio communications between said user and said host are communicated, via said mobile device, separate from, simultaneous with, and in addition to any audio associated with said live stream video, and wherein said live two-way audio communications are communicated and maintained separate from any of said audio associated with said live stream video so as not to merge said live two-way audio communications with any of said audio associated with said live stream video; and
    communicating any of said live two-way audio communications, via said mobile device, wherein said audio associated with said live stream video is captured, via said mobile device, via a microphone that is separate from a microphone used to capture said live two-way audio communications, and wherein said microphone used to capture said audio associated with said live stream video and said microphone used to capture said live two-way audio communications are each at a geographic location of said mobile device at the time said live stream video and any of said live two-way audio communications are being captured.

2. The method of claim 1, wherein at least a portion of said live stream video is recorded, stored, and provided as a Video On Demand (VOD) to one or more subsequent users.

3. The method of claim 1, wherein said live two-way audio communications between said user and said host allow said host to direct said user as to framing of the live stream video.

4. The method of claim 1, wherein said user may optionally establish one or more media host(s) or outlet(s), to be associated with a particular event description or tag.

5. The method of claim 1, wherein said mobile device is a point of view camera or a video camera.

6. The method of claim 1, wherein allowing said user to live stream video and provide said live stream video to said one or more media host(s) or outlet(s) includes allowing said user to capture live stream video and provide said live stream video exclusively to said one or more media host(s) or outlet(s).

7. The method of claim 1, further comprising:
    allowing said one or more media host(s) or outlet(s) to provide said live stream video to one or more subsequent users.

8. The method of claim 1, further comprising:
    requiring said user to designate at least one categorization for said live stream video, prior to capturing said live stream video.

9. The method of claim 1, further comprising:
    allowing said one or more media host(s) or outlet(s) to provide said live stream video to one or more subsequent viewers, based on said at least one categorization for said live stream video.

10. The method of claim 1, further comprising:
    allowing said one or more media host(s) or outlet(s) to store said live stream video.

11. The method of claim 1, wherein said live two-way audio communications with said user enable said host to query and/or direct said user.

12. The method of claim 1, wherein said one or more media host(s) or outlet(s) is enabled to engage in text or nonverbal communications with said user, as said live stream video is being captured.

13. The method of claim 1, further comprising:
    requiring said user to designate at least one categorization for said live stream video, prior to capturing said live stream video.

14. The method of claim 1, further comprising:
    identifying said geographic location where said live stream video is captured and wherein said live stream video is accessed, based on said at least one categorization for said live stream video.

15. A method for providing captured live stream video to a subsequent user device, via a media host or outlet, comprising:
    associating said mobile device with one or more media host(s) or outlet(s), such that said one or more media host(s) or outlet(s) will be recipient(s) of live stream video from said mobile device;
    allowing said subsequent user device to be associated with said media host or outlet;
    allowing a user to live stream video, via a mobile device, and provide said live stream video to said media host or outlet, wherein a host of said media host or outlet is enabled to engage in live two-way audio communications with said user, via said mobile device, as said live stream video is being captured, wherein said live two-way audio communications between said user and said host are communicated, via said mobile device, separate from, simultaneous with, and in addition to any audio associated with said live stream video, wherein said live two-way audio communications are communicated and maintained separate from any of said audio associated with said live stream video so as not to merge said live two-way audio communications with any of said audio associated with said live stream video, and wherein said live stream video includes at least one categorization for said live stream video, as designated by said user prior to capturing said live stream video;

communicating any of said live two-way audio communications, via said mobile device, wherein said audio associated with said live stream video is captured, via said mobile device, via a microphone that is separate from a microphone used to capture said live two-way audio communications, and wherein said microphone used to capture said audio associated with said live stream video and said microphone used to capture said live two-way audio communications are each at a geographic location of said mobile device at the time said live stream video and any of said live two-way audio communications are being captured; and allowing said subsequent user to access, via said subsequent user device, said captured live stream video, via said media host or outlet.

16. The method of claim 15, wherein at least a portion of said live stream video is recorded, stored, and provided as a Video On Demand (VOD) to one or more subsequent users.

17. The method of claim 15, wherein said one or more media host(s) or outlet(s) is enabled to engage in text or nonverbal communications with said user, as said live stream video is being captured.

18. The method of claim 15, further comprising:
allowing said one or more media host(s) or outlet(s) to store said captured live stream video.

19. The method of claim 15, wherein said mobile device is a point of view camera or a video camera.

20. A method for providing captured live stream video to a media host or outlet, comprising:

associating said mobile device with one or more media host(s) or outlet(s), such that said one or more media host(s) or outlet(s) will be recipient(s) of live stream video from said mobile device;

allowing a user to capture live stream video, via a mobile device, and provide said captured live stream video to at least one media host or outlet, wherein a host of said at least one media host or outlet is enabled to engage in live two-way audio communications with said user, via said mobile device, as said live stream video is being captured, wherein said live two-way audio communications between said user and said host are communicated, via said mobile device, separate from, simultaneous with, and in addition to any audio associated with said live stream video, and wherein said live two-way audio communications are communicated and maintained separate from any of said audio associated with said live stream video so as not to merge said live two-way audio communications with any of said audio associated with said live stream video; and communicating any of said live two-way audio communications, via said mobile device, wherein said audio associated with said live stream video is captured, via said mobile device, via a microphone that is separate from a microphone used to capture said live two-way audio communications, and wherein said microphone used to capture said audio associated with said live stream video and said microphone used to capture said live two-way audio communications are each at a geographic location of said mobile device at the time said live stream video and any of said live two-way audio communications are being captured.

* * * * *